(12) United States Patent
Yoshida

(10) Patent No.: US 9,544,459 B2
(45) Date of Patent: Jan. 10, 2017

(54) INFORMATION PROCESSING APPARATUS, IMAGE FORMING APPARATUS, INFORMATION PROCESSING SYSTEM, METHOD FOR CONTROLLING INFORMATION PROCESSING APPARATUS, METHOD FOR CONTROLLING IMAGE FORMING APPARATUS, AND STORAGE MEDIUM STORING PROGRAM

(71) Applicant: CANON KABUSHIKI KAISHA, Tokyo (JP)

(72) Inventor: Toru Yoshida, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/806,060

(22) Filed: Jul. 22, 2015

(65) Prior Publication Data
US 2016/0028913 A1    Jan. 28, 2016

(30) Foreign Application Priority Data
Jul. 28, 2014    (JP) ................................ 2014-152984

(51) Int. Cl.
*H04N 1/00*    (2006.01)
(52) U.S. Cl.
CPC ...... *H04N 1/00933* (2013.01); *H04N 1/00244* (2013.01); *H04N 2201/0094* (2013.01)
(58) Field of Classification Search
None
See application file for complete search history.

(56) References Cited

U.S. PATENT DOCUMENTS

2008/0091065 A1*  4/2008  Oshima ................. A61B 1/045
                                                              600/109
2016/0013892 A1*  1/2016  Suzuki .................. H04L 1/1621
                                                              370/328

FOREIGN PATENT DOCUMENTS

| JP | 11161441 A | * | 6/1999 |
| JP | 2005-117338 A | | 4/2005 |
| JP | 2011-070636 A | | 4/2011 |
| JP | 2013168096 A | * | 8/2013 |

* cited by examiner

*Primary Examiner* — Fan Zhang
(74) *Attorney, Agent, or Firm* — Canon U.S.A., Inc. IP Division

(57) ABSTRACT

In a case where an image forming apparatus is connected to an information processing apparatus, correction information is generated through comparison between time information obtained by the image forming apparatus and time information obtained by the information processing apparatus. The image forming apparatus transmits, to the information processing apparatus, time information indicating a time at which setting information is updated in the image forming apparatus. The information processing apparatus corrects the received time information with the correction information. The information processing apparatus determines whether to update setting information stored in the information processing apparatus with received setting information, based on the corrected time information.

23 Claims, 21 Drawing Sheets

FIG. 7

SERVER PC 120

| ID | IDENTIFIER | NAME | DATE AND TIME CORRECTION VALUE |
|---|---|---|---|
| 10001 | abc12345 | DIGITAL MFP 110a | -00:05:00 |
| 10002 | abc67890 | DIGITAL MFP 110b | 00:05:00 |

FIG. 9

DIGITAL MFP 110a

| ID | ADDRESS NAME | ADDRESS | LATEST DATA ACQUISITION DATE AND TIME |
|---|---|---|---|
| 10001 | A CORPORATION | 03-1234-5678 | 2014/4/23 10:00:00 |

DIGITAL MFP 110b

| ID | ADDRESS NAME | ADDRESS | LATEST DATA ACQUISITION DATE AND TIME |
|---|---|---|---|
| 10001 | A CORPORATION | 03-1234-5678 | 2014/4/23 10:00:00 |

SERVER PC 120

| ID | ADDRESS NAME | ADDRESS | LATEST DATA ACQUISITION DATE AND TIME | DATA UPDATE DATE AND TIME |
|---|---|---|---|---|
| 10001 | A CORPORATION | 03-1234-5678 | 2014/4/23 10:00:00 | 2014/4/23 10:00:00 |

FIG. 11

DIGITAL MFP 110a

| ID | ADDRESS NAME | ADDRESS | LATEST DATA ACQUISITION DATE AND TIME |
|---|---|---|---|
| 0001 | A CORPORATION | 03-2345-6789 | 2014/4/23 10:00:00 |

DIGITAL MFP 110b

| ID | ADDRESS NAME | ADDRESS | LATEST DATA ACQUISITION DATE AND TIME |
|---|---|---|---|
| 0001 | A CORPORATION | 03-3456-7890 | 2014/4/23 10:00:00 |

SERVER PC 120

| ID | ADDRESS NAME | ADDRESS | LATEST DATA ACQUISITION DATE AND TIME | DATA UPDATE DATE AND TIME |
|---|---|---|---|---|
| 0001 | A CORPORATION | 03-3456-7890 | 2014/4/23 10:59:00 | 2014/4/23 10:59:10 |

FIG. 13

DIGITAL MFP 110a

| ID | ADDRESS NAME | ADDRESS | LATEST DATA ACQUISITION DATE AND TIME |
|---|---|---|---|
| 0001 | A CORPORATION | 03-3456-7890 | 2014/4/23 11:00:00 |

DIGITAL MFP 110b

| ID | ADDRESS NAME | ADDRESS | LATEST DATA ACQUISITION DATE AND TIME |
|---|---|---|---|
| 0001 | A CORPORATION | 03-3456-7890 | 2014/4/23 11:00:10 |

SERVER PC 120

| ID | ADDRESS NAME | ADDRESS | LATEST DATA ACQUISITION DATE AND TIME | DATA UPDATE DATE AND TIME |
|---|---|---|---|---|
| 0001 | A CORPORATION | 03-3456-7890 | 2014/4/23 10:59:00 | 2014/4/23 10:59:10 |

FIG. 16

SERVER PC 120

| ID | IDENTIFIER | NAME | DATE AND TIME CORRECTION VALUE |
|---|---|---|---|
| 10001 | abc12345 | DIGITAL MFP 110a | 00:00:10 |
| 10002 | abc67890 | DIGITAL MFP 110b | 00:05:00 |

FIG. 17

DIGITAL MFP 110a

| ID | ADDRESS NAME | ADDRESS | LATEST DATA ACQUISITION DATE AND TIME |
|---|---|---|---|
| 0001 | A CORPORATION | 03-2345-6789 | 2014/4/23 10:00:00 |

DIGITAL MFP 110b

| ID | ADDRESS NAME | ADDRESS | LATEST DATA ACQUISITION DATE AND TIME |
|---|---|---|---|
| 0001 | A CORPORATION | 03-3456-7890 | 2014/4/23 10:00:10 |

SERVER PC 120

| ID | ADDRESS NAME | ADDRESS | LATEST DATA ACQUISITION DATE AND TIME | DATA UPDATE DATE AND TIME |
|---|---|---|---|---|
| 0001 | A CORPORATION | 03-3456-7890 | 2014/4/23 10:59:00 | 2014/4/23 10:59:10 |

FIG. 19

DIGITAL MFP 110a

| KEY | VALUE | LATEST DATA ACQUISITION DATE AND TIME |
|---|---|---|
| PERFORM AUTHENTICATION | ON | 2014/4/23 10:00:00 |
| USE PERSONALIZED SETTING | ON | 2014/4/23 10:00:00 |

DIGITAL MFP 110b

| KEY | VALUE | LATEST DATA ACQUISITION DATE AND TIME |
|---|---|---|
| PERFORM AUTHENTICATION | ON | 2014/4/23 10:00:00 |
| USE PERSONALIZED SETTING | ON | 2014/4/23 10:00:00 |

SERVER PC 120

| KEY | VALUE | LATEST UPDATE DATE AND TIME | LATEST DATA ACQUISITION DATE AND TIME |
|---|---|---|---|
| PERFORM AUTHENTICATION | ON | 2014/4/23 10:00:00 | 2014/4/23 10:00:00 |
| USE PERSONALIZED SETTING | ON | 2014/4/23 10:00:00 | 2014/4/23 10:00:00 |

FIG. 20

DIGITAL MFP 110a

| KEY | VALUE | LATEST DATA ACQUISITION DATE AND TIME |
|---|---|---|
| PERFORM AUTHENTICATION | OFF | 2014/4/23 10:00:00 |
| USE PERSONALIZED SETTING | OFF | 2014/4/23 10:00:00 |

DIGITAL MFP 110b

| KEY | VALUE | LATEST DATA ACQUISITION DATE AND TIME |
|---|---|---|
| PERFORM AUTHENTICATION | ON | 2014/4/23 10:00:00 |
| USE PERSONALIZED SETTING | ON | 2014/4/23 11:20:00 |

SERVER PC 120

| KEY | VALUE | LATEST UPDATE DATE AND TIME | LATEST DATA ACQUISITION DATE AND TIME |
|---|---|---|---|
| PERFORM AUTHENTICATION | ON | 2014/4/23 10:00:00 | 2014/4/23 10:00:00 |
| USE PERSONALIZED SETTING | ON | 2014/4/23 11:20:00 | 2014/4/23 11:20:00 |

FIG. 21

DIGITAL MFP 110a

| KEY | VALUE | LATEST DATA ACQUISITION DATE AND TIME |
|---|---|---|
| PERFORM AUTHENTICATION | OFF | 2014/4/23 11:30:00 |
| USE PERSONALIZED SETTING | OFF | 2014/4/23 11:30:00 |

DIGITAL MFP 110b

| KEY | VALUE | LATEST DATA ACQUISITION DATE AND TIME |
|---|---|---|
| PERFORM AUTHENTICATION | OFF | 2014/4/23 11:30:00 |
| USE PERSONALIZED SETTING | OFF | 2014/4/23 11:30:00 |

SERVER PC 120

| KEY | VALUE | LATEST UPDATE DATE AND TIME | LATEST DATA ACQUISITION DATE AND TIME |
|---|---|---|---|
| PERFORM AUTHENTICATION | OFF | 2014/4/23 11:00:00 | 2014/4/23 11:30:00 |
| USE PERSONALIZED SETTING | OFF | 2014/4/23 11:00:00 | 2014/4/23 11:30:00 |

INFORMATION PROCESSING APPARATUS, IMAGE FORMING APPARATUS, INFORMATION PROCESSING SYSTEM, METHOD FOR CONTROLLING INFORMATION PROCESSING APPARATUS, METHOD FOR CONTROLLING IMAGE FORMING APPARATUS, AND STORAGE MEDIUM STORING PROGRAM

BACKGROUND

Field of the Technique

The present invention relates to an information processing apparatus, an image forming apparatus, an information processing system, a method for controlling the information processing apparatus, a method for controlling the image forming apparatus, and a storage medium storing a program.

Description of the Related Art

Conventionally, there have been known an information processing system which synchronizes data managed between information processing apparatuses including an image processing apparatus. In this context, Japanese Patent Application Laid-Open No. 2011-70636 discusses the following technique for ensuring consistency of an order in which data is changed. More specifically, an information processing apparatus on a transmitter side transmits change contents to an information processing apparatus on a receiver side in an order in which the data is changed, and the information processing apparatus on the receiver side reflects the change in the received order.

Japanese Patent Application Laid-Open No. 2005-117338 discusses the following technique for ensuring consistency of an order in which data is changed. More specifically, the change contents are each provided with changed date and time information, and are processed in an order of date and time. Japanese Patent Application Laid-Open No. 2005-117338 also discusses the following technique for correcting date and time information of data. More specifically, if a clock of one information processing apparatus is not synchronized with a clock of another information processing apparatus, the date and time information is corrected during data exchange.

However, the conventional techniques fail to consider a case where the same data is changed by a plurality of information processing apparatuses and a case where a clock of the information processing apparatus is changed. Thus, data change processing cannot be properly conducted when change requests to the same data are transmitted from a plurality of information processing apparatuses in random order.

SUMMARY

Exemplary embodiments described below provide a mechanism for enabling the management of data in a state where information to be acquired from each information processing apparatus together with date and time information is synchronized with a reference time on a server apparatus side, in consideration of difference information relative to the reference time.

According to an aspect of the present invention, an information processing apparatus includes a reception unit configured to receive, from an image forming apparatus, first time information obtained by the image forming apparatus at a first time, second time information obtained by the image forming apparatus at a second time that is a time at which setting information of the image forming apparatus is updated and which is later than the first time, and the setting information updated at the second time, a storage unit configured to store setting information of the image forming apparatus in association with time information indicating a time at which the setting information is updated, a time measuring unit configured to measure a time, a holding unit configured to hold correction information generated through comparison between the first time information and third time information obtained by the time measuring unit in response to reception of the first time information, an acquisition unit configured to acquire corrected time information obtained by correcting the second time information received by the reception unit with the correction information, and a determination unit configured to determine whether to update the setting information stored in the storage unit with the setting information received by the reception unit, based on comparison between the time information associated with the setting information stored in the storage unit and the corrected time information.

According to another aspect of the present invention, an image forming apparatus includes a time measuring unit, a storage unit configured to store setting information to be used for operating the image forming apparatus, and a transmission unit configured to transmit, in response to the image forming apparatus switching from a state of not being connected to an information processing apparatus to a state of being connected to the information processing apparatus, first time information obtained by the time measuring unit, and after transmitting the first time information, transmit time information obtained by the time measuring unit at a timing at which the setting information stored in the storage unit is updated and the updated setting information to the information processing apparatus.

Further features of the present invention will become apparent from the following description of exemplary embodiments with reference to the attached drawings.

BRIEF DESCRIPTION OF THE DRAWINGS

FIG. 7 is a diagram illustrating management data managed by the server PC.

FIG. 9 is a diagram illustrating an example of data held in MFPs and the server PC.

FIG. 11 is a diagram illustrating an example of data held in the MFPs and the server PC.

FIG. 13 is a diagram illustrating an example of data held in the MFPs and the server PC.

FIG. 16 is a diagram illustrating information managed by a data management unit of the server apparatus.

FIG. 17 is a diagram illustrating an example of data held in the MFPs and the server PC.

FIG. 19 is a diagram illustrating information managed by the data management unit of the server apparatus.

FIG. 20 is a diagram illustrating an example of data held in the MFPs and the server PC.

FIG. 21 is a diagram illustrating an example of data held in the MFPs and the server PC.

DESCRIPTION OF THE EMBODIMENTS

Exemplary embodiments of the present invention will be described below with reference to the drawings.
<Description on System Configuration>

Figure 1:
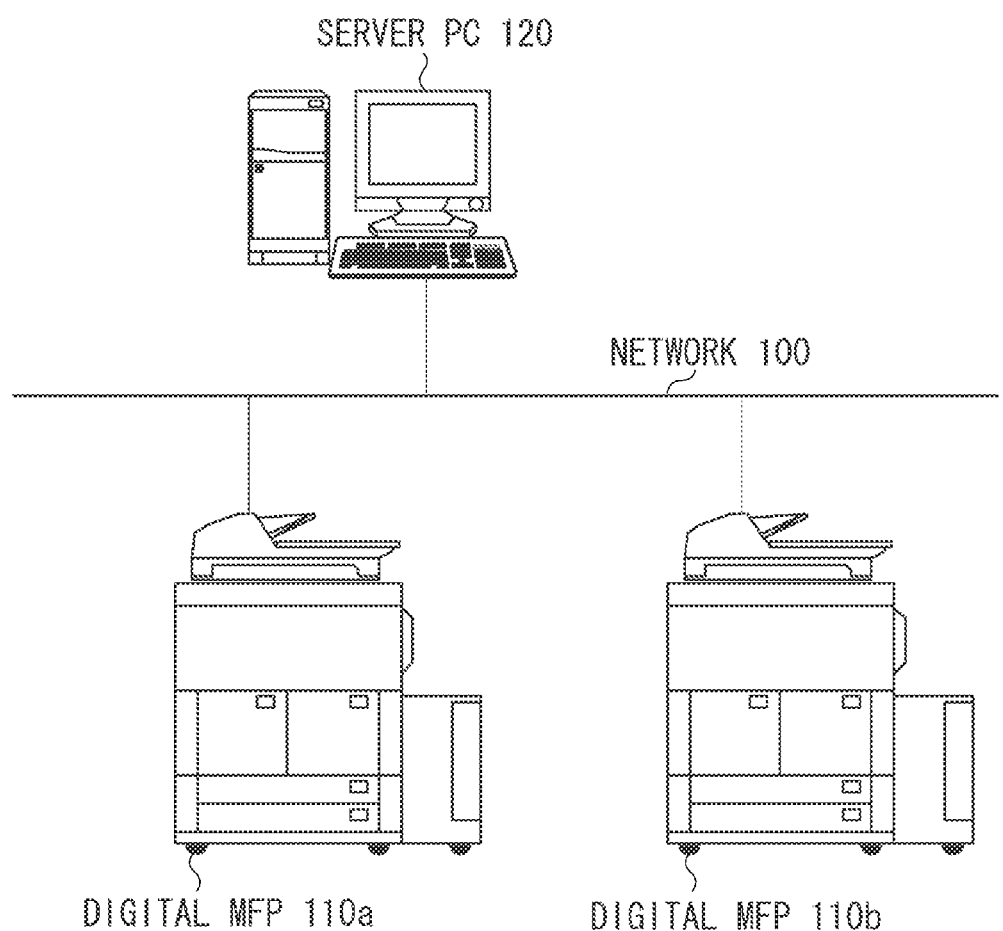
FIG. 1 is a diagram illustrating a configuration of an information processing system.

FIG. 1 is a diagram illustrating a configuration of an information processing system according to a first exemplary embodiment. In the present exemplary embodiment, the description will be given of an example where multi-function peripherals (MFPs) 110a and 110b (hereinafter, also referred to as digital MFPs 110) are used as examples of a client information processing apparatus, and a server personal computer (PC) 120 is used as an example of a server information processing apparatus (hereinafter, also referred to as a server apparatus). The server apparatus and the MFP may be integrally formed. The MFPs 110a and 110b and the server PC 120 can communicate with each other through a network 100. The MFPs 110a and 110b each execute a job for processing predetermined data, and function as an image forming apparatus.

In FIG. 1, data (setting information) is managed in the server PC 120 in association with identifier information of the MFP 110a or 110b and date and time information, in accordance with a user operation or execution of copy/FAX processing in the MFP 110a or 110b. When the data is changed, the MFPs 110a and 110b transmit the change content to the server PC 120 to request data update. The digital MFP 110 inquires whether data managed by the server PC 120 has been updated, periodically or when needed. When the data has been updated, the digital MFP 110 acquires and stores the data therein.

For example, when data managed by the server PC 120, such as address data including a FAX number in an address book, is used by both of the MFPs 110a and 110b, the following synchronization processing is executed for the address data such as a phone number used in a specific job. The specific job includes a FAX job for reading a document and transmitting the resultant data to the phone number.

When address data needs to be changed in the MFP 110a due to a department transfer or addition of a new address, the server PC 120 is notified of the changed address data, whereby address data managed by the server PC 120 is updated.

Then, the MFP 110b inquires of the server PC 120 whether data has been updated, and the server PC 120 transmits, to the MFP 110b, the above-described address data as update data. Upon receiving the address data, the MFP 110b updates and stores the address data therein.

In the present exemplary embodiment, the description is given of a case where the server PC serves as an example of the server apparatus and the digital MFPs serve as examples of the client information processing apparatus. It is a matter of course that, alternatively, the digital MFPs may serve as the server apparatus and a PC may serve as the client apparatus. In the present exemplary embodiment, the description is given of a case where the address data serves as an example of the data to be synchronized. It is a matter of course that, alternatively, data of another type may be synchronized.

Figure 2:
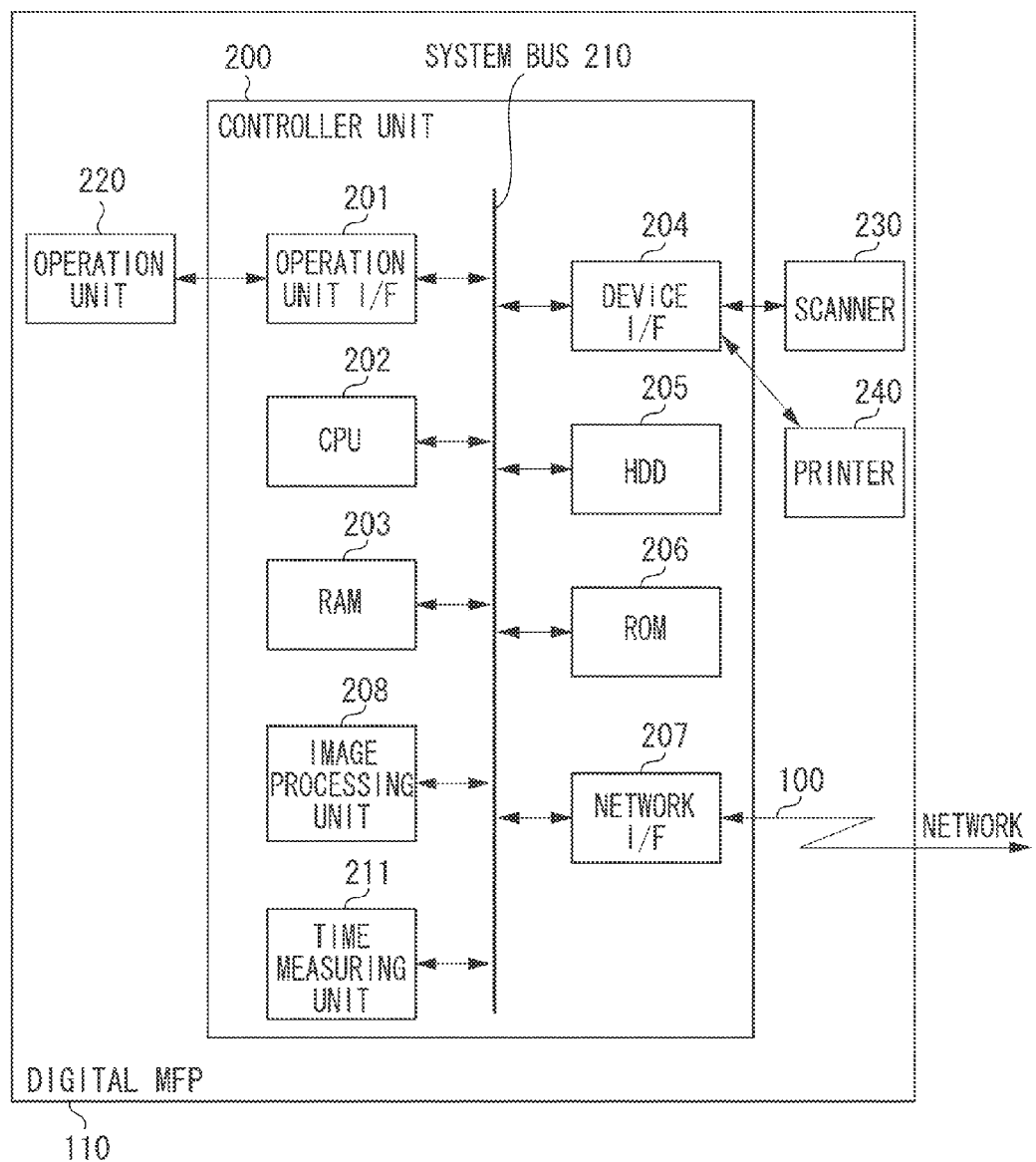
FIG. 2 is a block diagram illustrating a configuration of a digital multifunction peripheral (MFP).

FIG. 2 is a block diagram illustrating a configuration of the digital MFP 110 illustrated in FIG. 1.

In FIG. 2, the digital MFP 110 includes a controller unit 200, an operation unit 220, a scanner 230, and a printer 240. The operation unit 220, the scanner 230 as an image input device, and the printer 240 as an image output device are connected to the controller unit 200.

More specifically, the controller unit 200 includes a central processing unit (CPU) 202. The CPU 202 starts an operating system (OS) by a boot program stored in a read only memory (ROM) 206. The controller unit 200 executes, on the OS, an application program stored in a hard disk drive (HDD) 205 to thereby execute various types of processing. A random access memory (RAM) 203 is used as a work area for the CPU 202. The HDD 205 stores the above-described application program and various types of data.

The ROM 206, the RAM 203, an operation unit interface (I/F) 201, a device I/F 204, a network I/F 207, an image processing unit 208, and an external serial I/F 209 are connected to the CPU 202 through a system bus 210. A time measuring unit 211 measures a time.

The operation unit I/F 201 is an interface to the operation unit 220 including a touch panel. The operation unit I/F 201 transmits information such as various types of data to be displayed, to the operation unit 220, and transmits information input by a user, to the CPU 202. The scanner 230 and the printer 240 are connected to the device I/F 204 to input and output data and a control signal. The network I/F 207 is connected to the network 100 to input and output information to and from apparatuses on the network 100, through the network 100. The image processing unit 208 processes an image input from the scanner 230 and an image to be output to the printer 240, and executes processing such as image rotation, image compression, resolution conversion, color space conversion, and gradation conversion.

Figure 3:
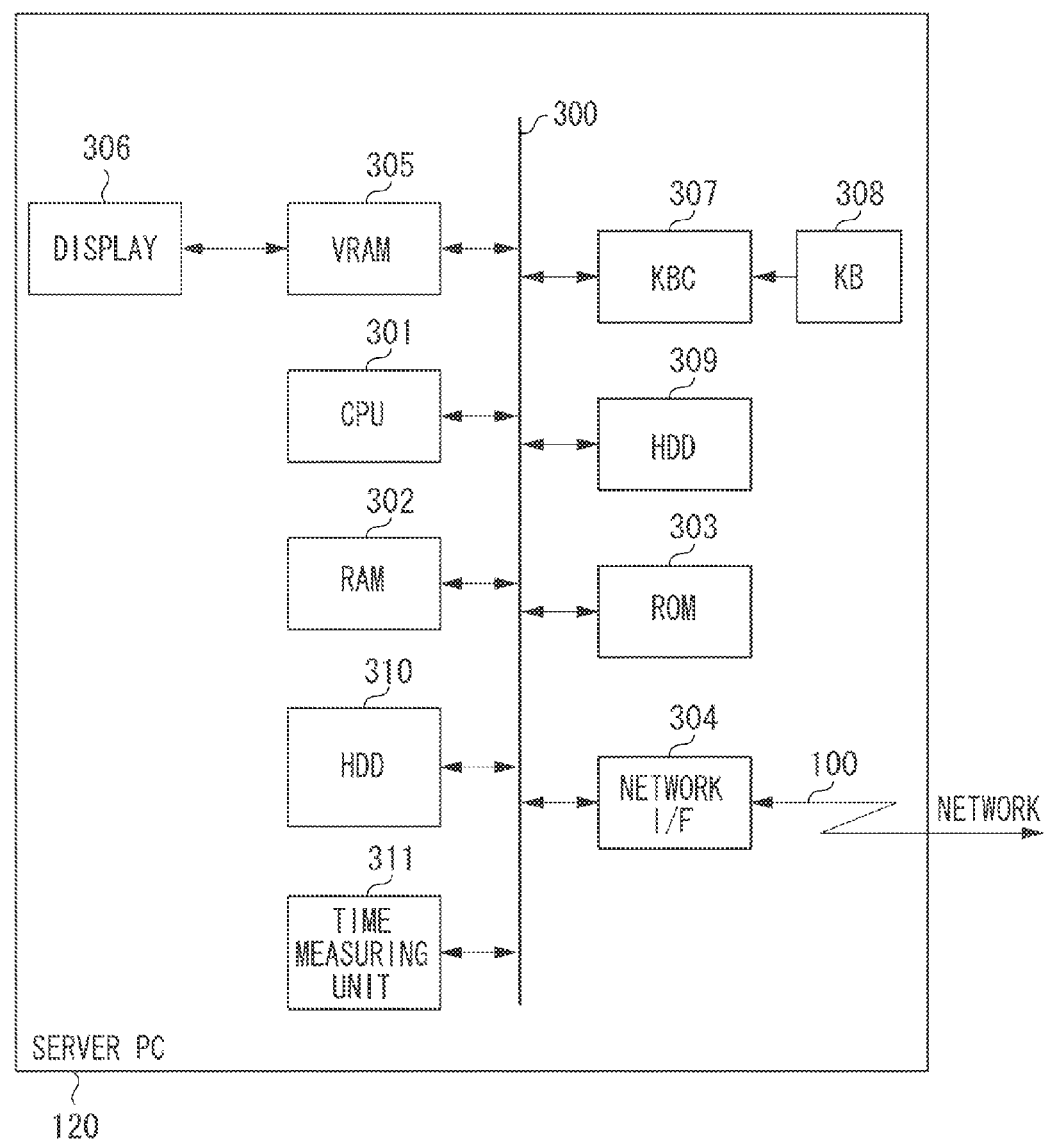
FIG. 3 is a block diagram illustrating a configuration of a server personal computer (PC).

FIG. 3 is a block diagram illustrating a configuration of the server PC 120 illustrated in FIG. 1.

As illustrated in FIG. 3, the server PC 120 includes a CPU 301, a RAM 302, and a ROM 303. The CPU 301 is in charge of calculation and control in the information processing apparatus. The RAM 302 functions as a main memory of the CPU 301, an area for an execution program, an execution area for the program, and a data area. The ROM 303 stores a procedure of operation processing executed by the CPU 301. The ROM 303 includes a program ROM and a data ROM. Basic software (OS) as a system program for controlling the information processing apparatus is recoded on the program ROM. Information required for operating the system and the like are recorded on the data ROM. An HDD 309 described below is used instead of the ROM 303 in some cases. A time measuring unit 311 measures a time.

The server PC 120 further includes a network I/F 304, a video RAM (VRAM) 305, and a display device (display) 306. The network I/F 304 performs communications such as transmission and reception of data to and from the digital MFPs 110a and 110b through the network 100. An image to be displayed on a screen of the display 306 of the information processing apparatus is loaded into the VRAM 305 for controlling the displaying of the image.

The server PC 120 further includes a transmission bus (an address bus, a data bus, an input/output (I/O) bus, and a control bus) 300, a controller (KBC) 307, an external input device (KB) 308, and the HDD 309. The KBC 307 controls an input signal from the KB 308 that receives an operation performed by the user. For example, the KB 308 includes a keyboard and a pointing device such as a mouse. The HDD 309 is used for storing the application program and various types of data. The transmission bus 300 connects between the units described above.

Figure 4:
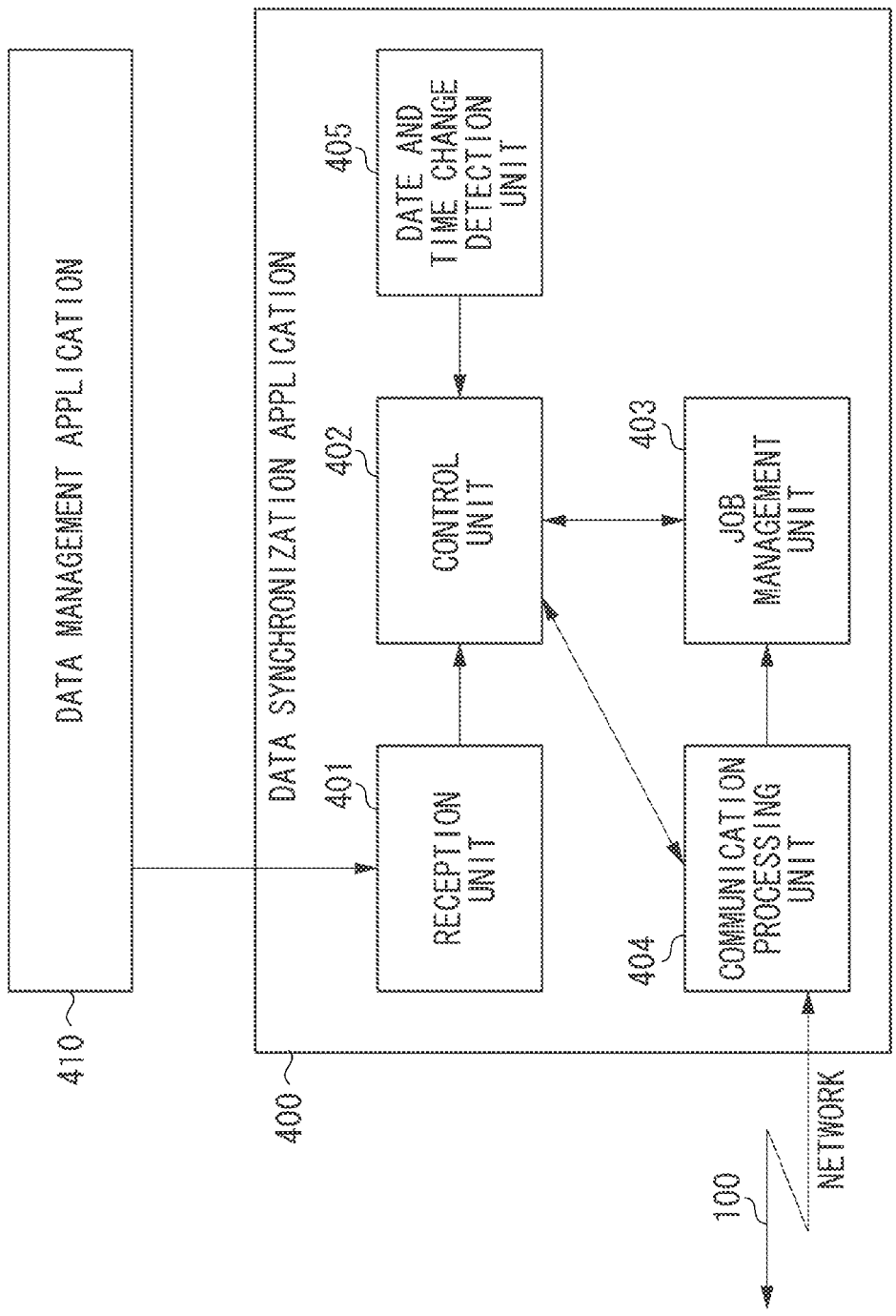
FIG. 4 is a diagram illustrating a configuration of a program that operates on the MFP.

FIG. 4 is a diagram illustrating a configuration of a data synchronization application program that operates on the MFPs 110a and 110b illustrated in FIG. 1.

A data synchronization application 400 in FIG. 4 includes a reception unit 401 that receives a processing request from a data management application 410 and the like, and a control unit 402 that controls processing.

The data synchronization application 400 further includes a job management unit 403 that manages a request received by the reception unit 401, as a job. The data synchronization application 400 further includes a communication processing unit 404 that performs data communications with the server PC 120 through the network I/F 207, and a date and time change detection unit 405 that detects a change of date and time information of the MFPs 110a and 110b. The information managed by the job management unit 403 is stored in the HDD 205, the RAM 203, or the like. The data management application 410 manages data to be displayed on the operation unit 220, holds data input by the user through the operation unit 220, and notifies the reception unit 401 of the data synchronization application 400 of the data update content.

The data synchronization application 400 and the data management application 410 are stored in any one of the RAM 203, the HDD 205, and the ROM 206 serving as storage units, and are executed by the CPU 202. The storage unit stores setting information used for operating the digital MFP 110.

Figure 5:
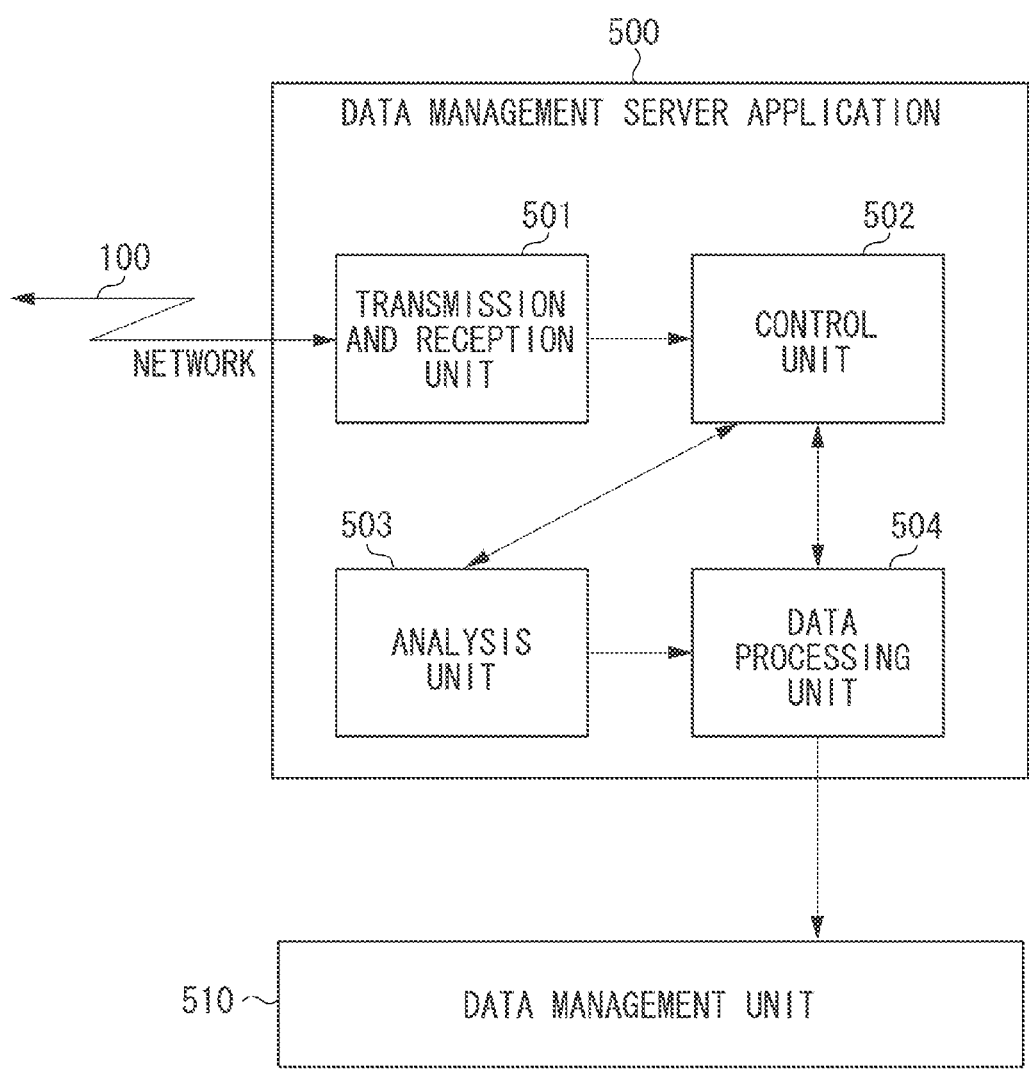
FIG. 5 is a diagram illustrating a configuration of a program that operates on the server PC.

FIG. 5 is a diagram illustrating a configuration of a data management server application program that operates on the server PC 120 illustrated in FIG. 1.

A data management server application 500 in FIG. 5 includes a transmission and reception unit 501 that receives a processing request from the data synchronization application 400 or the like and transmits a result. The data management server application 500 further includes a control unit 502 that controls processing, and an analysis unit 503 that analyzes the request received by the transmission and reception unit 501.

The data management server application 500 further includes a data processing unit 504 that executes generation/update/deletion/reference of data through communications with a data management unit 510, according to the processing request received by the transmission and reception unit 501. The information managed by the data management unit 510 is stored in the HDD 309, the RAM 302, or the like.

The data management server application 500 and the data management unit 510 are stored in any one of the RAM 302, the HDD 309, and the ROM 303 serving as storage units, and are executed by the CPU 301. The storage unit stores the setting information of the digital MFP 110 in association with time information indicating a time at which the setting information is updated. The storage unit further holds a date and time correction value (correction information) described below. When joining to the system, the MFPs 110a and 110b are registered in the server PC 120. The control unit 402 of the data synchronization application 400 identifies date and time information (first time information) of the MFP 110a or 110b, and transmits the date and time information (first time information) together with a registration request through the communication processing unit 404. As described above, the MFP 110a or 110b transmits, in response to switching to a state of being connected to the server PC 120 from a state of not being connected to the server PC 120, the first time information obtained by the time measuring unit 211 of the MFP 110a or 110b.

Figure 6:
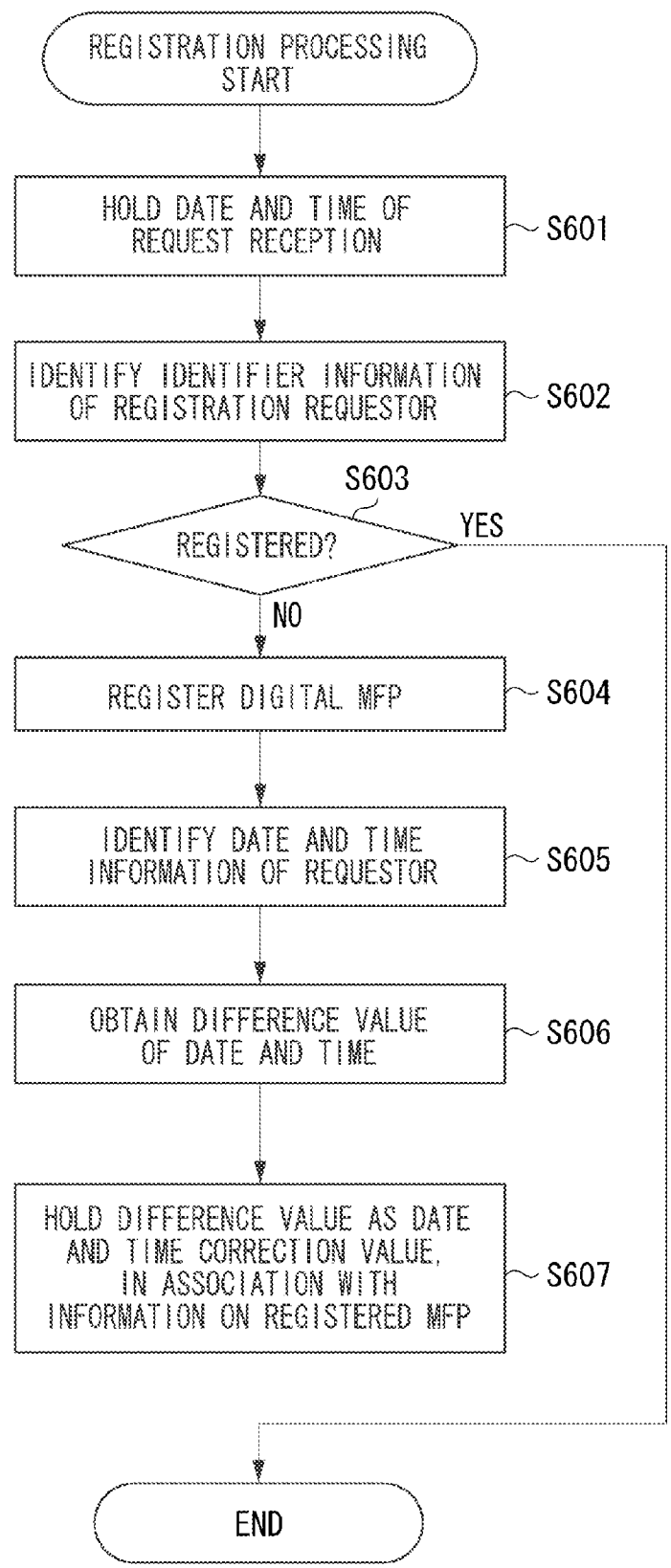
FIG. 6 is a flowchart illustrating a method for controlling an information processing apparatus.

FIG. 6 is a flowchart illustrating a method for controlling the information processing apparatus according to the present exemplary embodiment. This example corresponds to processing executed by the data management server application 500 operating on the server PC 120 when the registration request is received from the MFP 110a. Each step is implemented by the CPU 301 of the server PC 120 executing the stored data management server application 500. The data management server application 500 is hereinafter simply referred to as the application 500. In the processing described below, the steps are executed by the modules of the application 500 executed by the CPU 301.

In step S601, when the transmission and reception unit 501 receives each registration request, the control unit 502 holds, in the RAM 302, a date and time (third time information) indicating a time at which the server PC 120 receives the request. Thus, the time information obtained by the time measuring unit 311 in response to the reception of the time information from the MFP 110a is held. In step S602, the analysis unit 503 analyzes the request received by the transmission and reception unit 501, and identifies identifier information of the MFP 110a that has issued the registration request.

The identifier information is, for example, a serial number of the MFP 110a. When the control unit 502 requests the data processing unit 504 to execute the registration processing, in step S603, the data processing unit 504 determines whether the MFP 110a as the requestor has already been registered in the data management unit 510. When the data processing unit 504 determines that the MFP 110a has been already registered (YES in step S603), the registration request from the MFP 110a ends in an error, and the processing is terminated.

On the other hand, when the data processing unit 504 determines that the MFP 110a has not been registered in the data management unit 510 (NO in step S603), the processing proceeds to step S604, in which the data processing unit 504 registers the MFP 110a in the data management unit 510. The data management unit 510 stores, into the HDD 309, the identifier information of the MFP 110a in association with the acquired time information (date and time information described below, and hereinafter referred to as date and time information).

In step S605, the data processing unit 504 identifies the date and time information (first time information) of the MFP 110a that is included in the registration request from the MFP 110a. In step S606, the data processing unit 504 generates a date and time difference value (correction information) by comparing the date and time information (third time information) of the server PC 120 that is held in step S601 with the date and time information identified in step S605. In step S607, the data processing unit 504 requests the data management unit 510 to store the difference information value (00:00:00) calculated in step S606, in association with the information on the MFP 110a registered in step S604. The data management unit 510 registers the difference information value (difference time) as the date and time correction value, and the registration processing is completed.

FIG. 7 is a diagram illustrating the management data managed by the server PC 120 illustrated in FIG. 1. This example corresponds to an example of data managed by the data management unit 510 after the registration processing for the MFPs 110a and 110b has been completed. In this example, the date and time information (−00:00:05) of the MFP 110a is delayed from that of the server PC 120 by five minutes. The date and time information (00:00:05) of the MFP 110b is advanced from that of the server PC 120 by five minutes.

Next, each processing corresponding to a case where the same data in an address book is updated by the MFPs 110a and 110b will be described below with reference to a flowchart and a data example.

Figure 8:
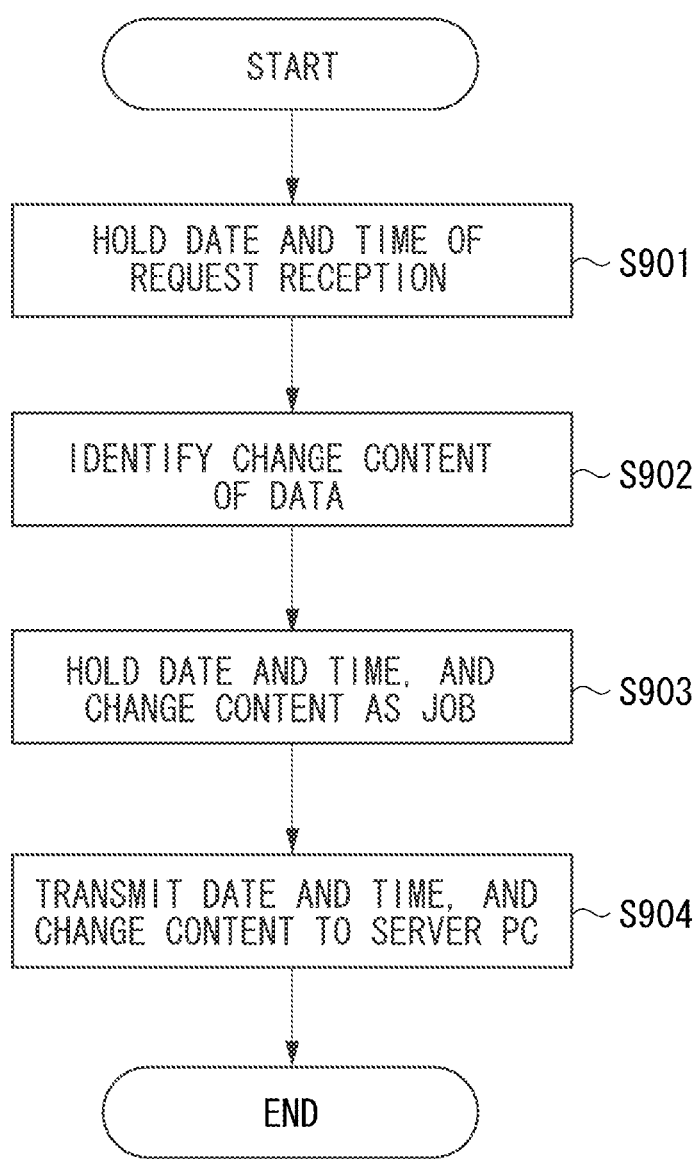
FIG. 8 is a flowchart illustrating a method for controlling an image forming apparatus.

FIG. 8 is a flowchart illustrating a method for controlling the image forming apparatus according to the present exemplary embodiment. This example corresponds to an example of processing in which the same address data (management information) in the address book is updated by the MFPs 110a and 110b illustrated in FIG. 1. Each step is implemented by the CPU 202 executing the control program stored in the HDD 205 and the like. In the processing described below, the steps are executed by the modules illustrated in FIG. 4.

FIG. 9 is a diagram illustrating an example of data held in the MFP 110a, the MFP 110b, and the server PC 120 illustrated in FIG. 1, before data is changed.

First of all, processing executed by the data synchronization application 400 when the address data is changed by the MFP 110a will be described. It is a matter of course that the address to be processed, which is a phone number in the present exemplary embodiment, may also be a specific email address or a uniform resource locator (URL).

When the user changes the address of an A corporation to "03-2345-6789" with the operation unit 220, the corresponding change instruction is issued to the data management application 410. The data management application 410 notifies the reception unit 401 of the data synchronization application 400 of the data change content.

In step S901, the MFP 110a holds, into the RAM 203, date and time information (second time information) of the MFP 110a that indicates the time when the reception unit 401 of the data synchronization application 400 has received the data change (update) request. Here, the date and time information is assumed to be "2014/04/23 11:00:00". In step S902, the control unit 402 identifies the data to be changed according to the request received by the reception unit 401. In step S903, the control unit 402 requests the job management unit 403 to register requested information based on the date and time information held in step S901 and the information identified in step S902, as a synchronization job. Thus, the job management unit 403 stores the requested information as the synchronization job in the HDD 205.

Once the job management unit 403 stores the synchronization job, the control unit 402 returns a response indicating a reception completion to the request from the data management application 410 that is received by the reception unit 401. In step S904, the control unit 402 reads out the synchronization job from the job management unit 403, and requests the communication processing unit 404 to transmit, to the server PC 120, the date and time information (second time information), and management information to be updated (updated setting information) that corresponds to the data change content. Then, the communication processing unit 404 transmits the requested content to the server PC 120, whereby the processing is terminated. As described above, after transmitting the time information indicating the time when the MFP 110a joins the system, the MFP 110a transmits, to the server PC 120, the time information obtained by the time measuring unit 211 at a timing at which the setting information is updated, together with the updated setting information.

Figure 10:
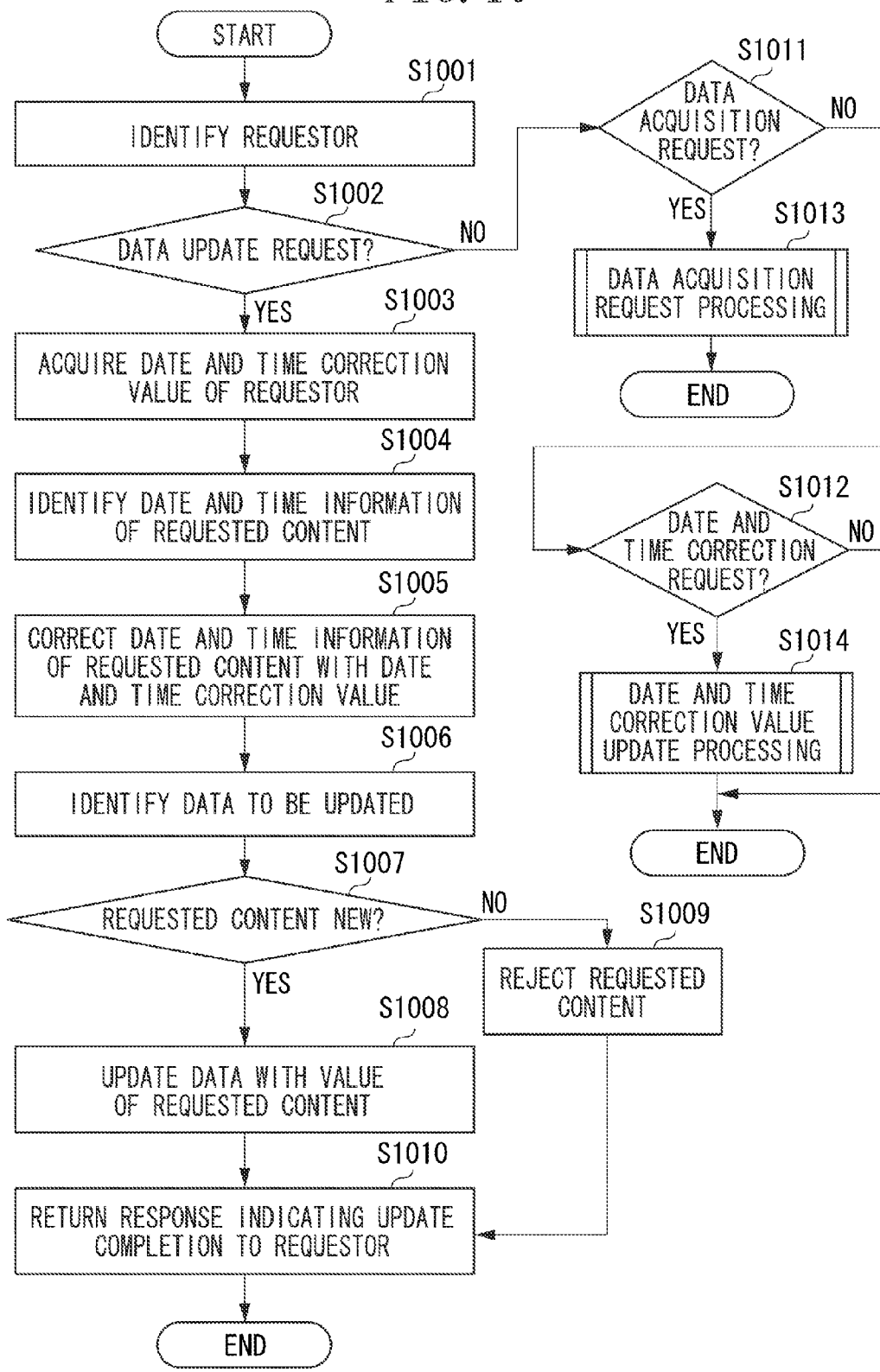
FIG. 10 is a flowchart illustrating a method for controlling a server apparatus.

FIG. 10 is a flowchart illustrating a method for controlling the server apparatus according to the present exemplary embodiment. This example corresponds to an example of processing executed when the address data change request from the MFP 110a is received by the data management server application 500 of the server PC 120. Each step is implemented by the CPU 301 of the server PC 120 executing the stored data management server application 500. Hereinafter, the data management server application 500 is simply referred to as the application 500. In the processing described below, the steps are executed by the modules of the application 500 executed by the CPU 301.

In step S1001, the transmission and reception unit 501 that has received the synchronization job corresponding to the address data update request from the MFP 110a notifies the control unit 502 of the received job, and the received content is transmitted from the control unit 502 to the analysis unit 503 to be analyzed, whereby the MFP 110a is identified as the requestor. When the requestor cannot be identified, the processing ends in an error (not illustrated).

In step S1002, the control unit 502 acquires the requested content from the analysis unit 503, and determines whether the synchronization job is the data update request. When the control unit 502 determines that the synchronization job is the data update request (Yes in step S1002), in step S1003, the control unit 502 acquires the date and time correction value "−00:05:00" of the MFP 110a from the data management unit 510. The date and time correction value is information indicating a difference between the time information obtained by the time measuring unit 311 of the server apparatus in response to the reception of the time information from the image forming apparatus, and the time information obtained by the time measuring unit 211 of the image forming apparatus. As described in detail below, whether the request of the synchronization job corresponds to a data acquisition request is determined in step S1011, and whether the synchronization job corresponds to a date and time correction request is determined in step S1012. Then, corresponding data acquisition request processing is executed in step S1013, and corresponding date and time correction value update processing is executed in step S1014.

In step S1004, the control unit 502 acquires the date and time information "2014/04/23 11:00:00" of the received content, from the analysis unit 503. In step S1005, the control unit 502 corrects the date and time information acquired in step S1004 with the date and time correction value acquired in step S1003 to obtain the date and time information "2014/04/23 10:55:00" of the update data. Thus, the control unit 502 acquires the time information (for example, "2014/04/23 10:55:00") obtained by correcting the received time information (for example, "2014/04/23 11:00:00") with the correction information (for example, the date and time correction value "−00:05:00"). In step S1006, the control unit 502 acquires the data content to be updated, from the analysis unit 503, and transmits the data content and the corrected date and time information "2014/04/23 10:55:00" obtained in step S1005, to the data processing unit 504. Then, the data processing unit 504 acquires the latest update date and time "2014/4/23 10:00:00" of the data to be updated from the data management unit 510.

In step S1007, the data processing unit 504 determines whether the update request is an update request corresponding to a date and time later than the held address data, by comparing the latest update date and time information of the address data acquired in step S1006 with the corrected date and time information obtained in step S1005. When the data processing unit 504 determines that requested content is new (Yes in step S1007), in step S1008, the data processing unit 504 requests the data management unit 510 to update the address data to be updated, with the requested value. Thus, the data management unit 510 updates the address data included in the held management information.

On the other hand, when the data processing unit 504 determines that the address data is not new (No in step S1007), in step S1009, the data processing unit 504 rejects the request corresponding to the synchronization job received from the MFP 110a identified in step S1001, and the processing proceeds to step S1010.

Here, the data processing unit 504 updates the latest update date and time of the updated address data with the corrected date and time information "2014/04/23 10:55:00" obtained in step S1005, and updates the data update date and time with the date and time information (for example, "2014/04/23 10:55:10") indicating the time when the processing is executed. As described above, when the setting information stored in the server PC 120 is updated with the received setting information, the server PC 120 updates the time information to be stored in association with the setting information. Once the updating is completed, in step S1010, the transmission and reception unit 501 returns a response indicating the update completion to the requestor, whereby the processing is completed. When it is determined that the MFP 110a or the MFP 110b as the requestor does not receive the response within a predetermined time period, it can be determined that the MFP 110a or the MFP 110b is not connected to the network 100.

As described above, whether to update the setting information stored in the server apparatus with the received setting information is determined based on comparison between the time information associated with the setting information stored in the server apparatus and the corrected time information.

The server apparatus determines to update the setting information stored in the server apparatus with the received setting information, when the time indicated by the corrected time information is later than the time indicated by the time information associated with the setting information stored in the storage unit. The server apparatus determines not to update the setting information stored in the server apparatus with the received setting information, when the time indicated by the corrected time information is earlier than the time indicated by the time information associated with the setting information stored in the server apparatus.

The storage unit of the server apparatus stores the time information indicating the time at which the setting information is updated. The time information stored in the storage unit is updated with the corrected time information when the stored setting information is updated with the received setting information.

Next, the description will be given of a case where the address of the A corporation that has been updated by the MFP 110a is further updated with "03-3456-7890" by the MFP 110b.

Here, the update request is assumed to be issued at a time "2014/04/23 10:54:00" based on the clock in the MFP 110b.

In step S1001 illustrated in FIG. 10, the transmission and reception unit 501 that has received the address data update request from the MFP 110b notifies the control unit 502 of the received content, and the content received by the control unit 502 is transmitted to the analysis unit 503 to be analyzed, whereby the MFP 110b is identified as the requestor.

In step S1002, the control unit 502 acquires the requested content from the analysis unit 503. If the control unit 502 determines that the requested content is the data update request (YES in step S1002), in step S1003, the control unit 502 acquires the date and time correction value "00:05:00" of the MFP 110b from the data management unit 510. In step S1004, the control unit 502 acquires the date and time information "2014/04/23 10:54:00" corresponding to the content received from the analysis unit 503. In step S1005, the control unit 502 corrects the date and time information acquired in step S1004, with the date and time correction value acquired in step S1003 to obtain the date and time information "2014/04/23 10:59:00" of the update data.

In step S1006, the control unit 502 acquires the data content to be updated from the analysis unit 503 and transmits the data content and the corrected date and time information "2014/04/23 10:59:00" obtained in step S1005 to the data processing unit 504. Then, the data processing unit 504 acquires the latest update date and time "2014/4/23 10:55:00" of the address data to be updated from the data management unit 510. In step S1007, the data processing unit 504 compares the latest update date and time of the address data acquired in step S1006 with the corrected date and time information obtained in step S1005, and determines that the update request is newer than the held address data. In step S1008, the data processing unit 504 requests the data management unit 510 to update the address data to be updated with the requested value, and thus the data management unit 510 updates the held address data.

Here, the data processing unit 504 updates the latest update date and time of the updated address data with the corrected date and time information "2014/04/23 10:59:00" obtained in step S1005, and updates the data update date and time with the date and time information (for example, "2014/04/23 10:59:10") indicating the time at which the processing is executed. When the updating is completed, in step S1010, the transmission and reception unit 501 returns a response indicating the update completion to the requestor, whereby the processing is completed.

FIG. 11 illustrates the address data held in the data management applications 410 of the MFPs 110a and 110b and in the data management unit 510 of the server PC 120, after the processing is completed.

Next, processing of acquiring the latest data from the server PC 120 that is executed by the digital MFP 110 will be described with reference to flowcharts illustrated in FIGS. 8 and 12.

The latest data acquisition request issued by the digital MFP 110 to the server PC 120 is provided with the latest data acquisition date and time information held in the digital MFP 110. When the transmission and reception unit 501 of the data management server application 500 receives the request, in step S1001, the requestor is identified. Then, in step S1011, it is determined that the data acquisition request has been issued, whereby the data acquisition request processing is executed.

Figure 12:
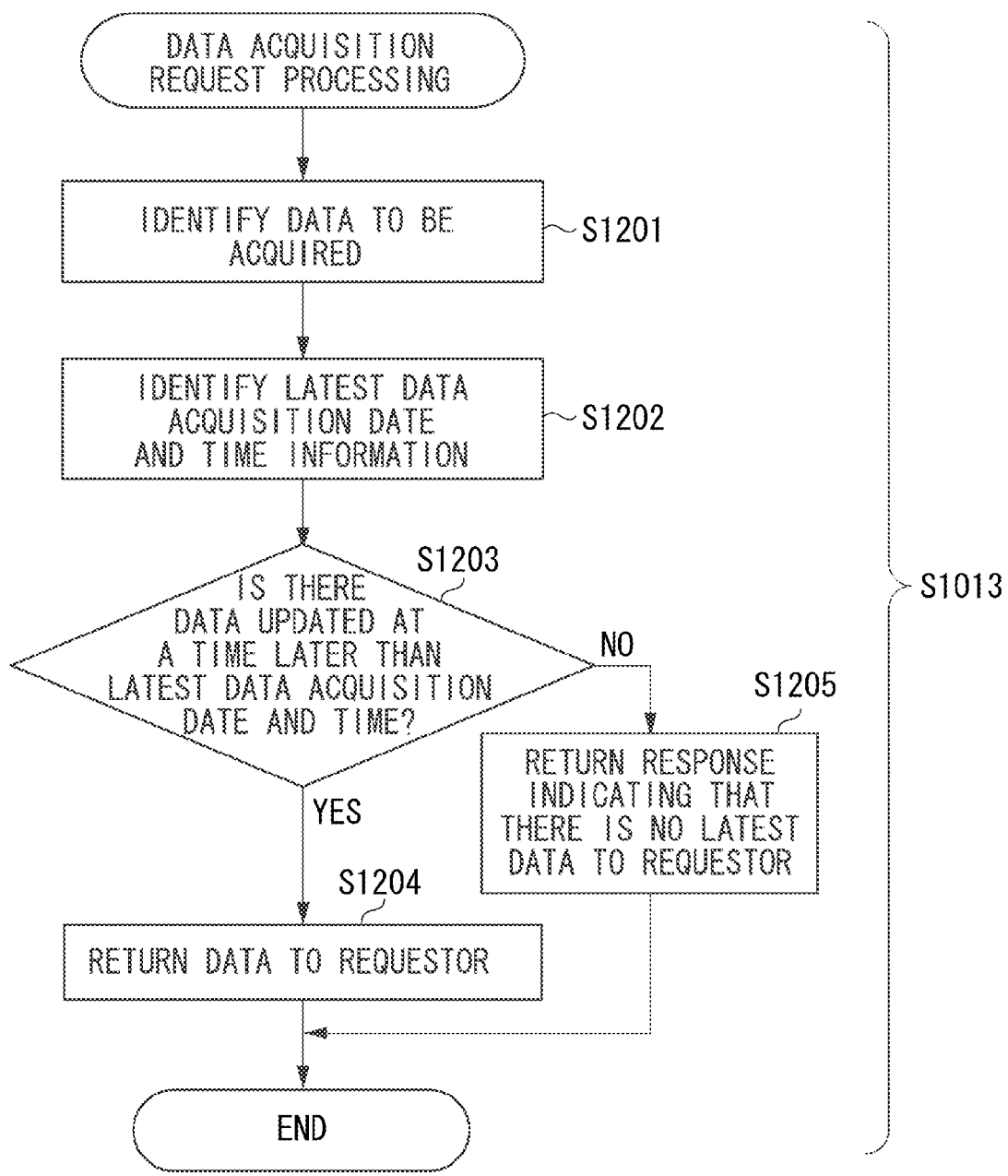
FIG. 12 is a flowchart illustrating a method for controlling the server apparatus.

FIG. 12 is a flowchart illustrating a method for controlling the server apparatus according to the present exemplary embodiment. Each step is implemented by the CPU 301 of the server PC 120 executing the stored data management server application 500. The data management server application 500 is hereinafter simply referred to as the application 500. In the processing described below, the steps are executed by the modules of the application 500 executed by the CPU 301.

In step S1201, the control unit 502 transmits the received content to the analysis unit 503, and the analysis unit 503 identifies that the address data is to be acquired. In step S1202, the control unit 502 identifies the latest data acquisition date and time information included in the request, from the analysis unit 503. Then, the control unit 502 transmits a message indicating that the address data is to be acquired and the latest data acquisition date and time information to the data processing unit 504. In step S1203, the data processing unit 504 checks whether address data updated at a time later than the time indicated by the date and time information of the latest data acquisition date and time information is included in the address data managed by the data management unit 510.

The data management unit 510 identifies, among the managed address data, data associated with the data update date and time later than the date and time indicated by the latest data acquisition date and time information. When the data management unit 510 responds at least one piece of address data, the processing proceeds to step S1204, in which the data management unit 510 returns, to the requestor, the responded address data and the date and time information indicating the time when the processing is executed.

When the data processing unit 504 determines in step S1203 that there is no corresponding address data, the data processing unit 504 returns only the date and time information indicating the time when the processing is executed, to the requestor in step S1205. If only the data and time information is returned to the MFP 110a, MFP 110a recognizes that there is no latest data. For example, the data acquisition request from the MFP 110a includes the latest data acquisition date and time information "2014/4/23 10:00:00". Thus, the data management unit 510 searches for the information with the data update date and time later than "2014/4/23 10:00:00". Here, the address data of the corporation A including the data update date and time "2014/4/23 10:59:10" is returned in response to the data acquisition request.

For example, FIG. 13 illustrates the address data held in the data management application 410 of the MFP 110a after the processing corresponding to the processing execution time "2014/4/23 11:00:00" in step S1203 is completed. FIG. 13 also illustrates address data held in the data management application 410 of the MFP 110b that has executed the similar data acquisition processing corresponding to the processing execution time "2014/4/23 11:00:10" in step S1203.

Figure 14:
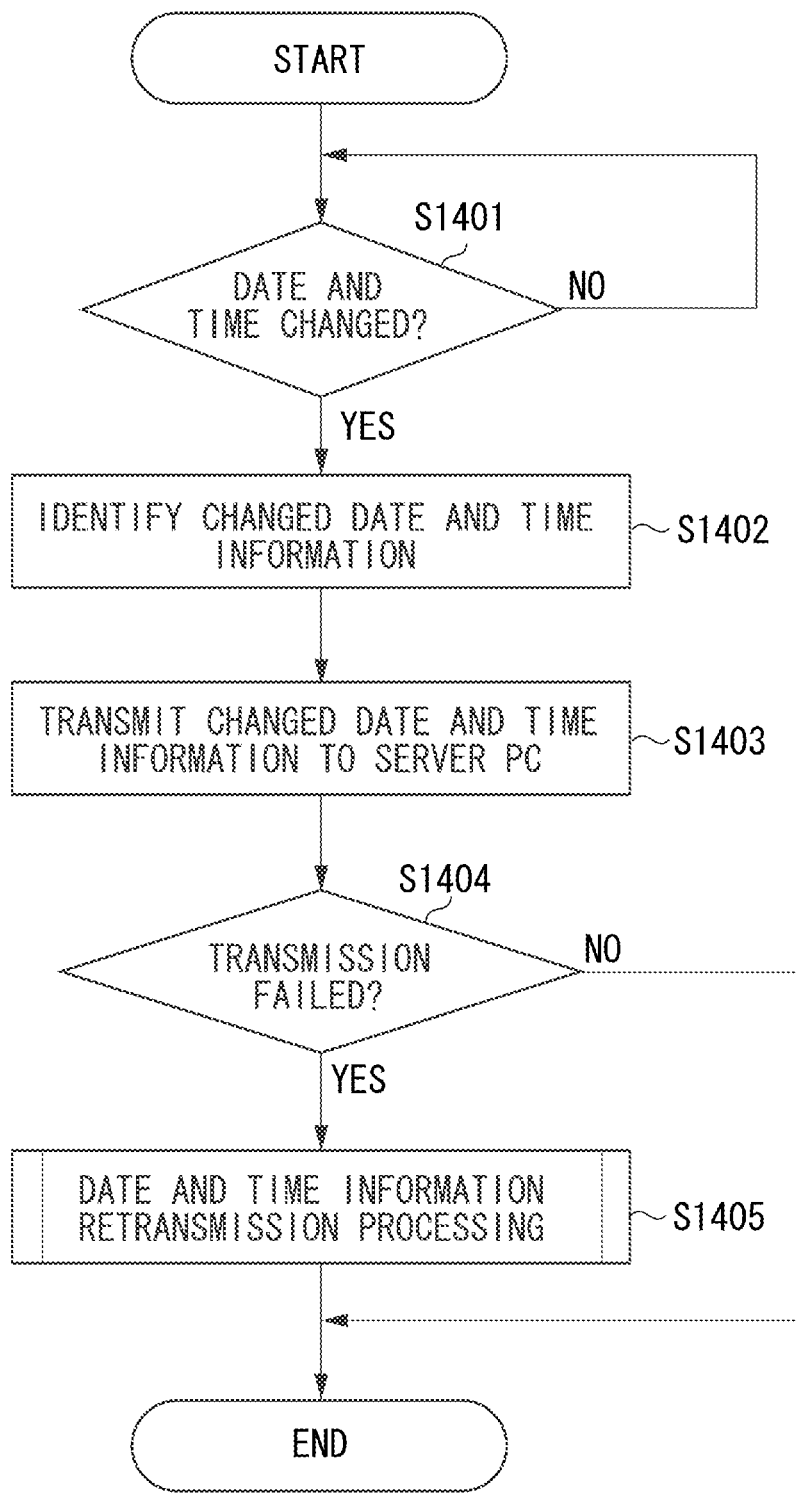
FIG. 14 is a flowchart illustrating a method for controlling the image forming apparatus.

FIG. 14 is a flowchart illustrating a method for controlling the image forming apparatus according to the present exemplary embodiment. This example corresponds to an example of processing executed when the data synchronization application 400 of the MFP 110a sets the clock back by five minutes. Each step is implemented by the CPU 202 executing the control program stored in the HDD 205 or the like. In the processing described below, the steps are executed by the modules illustrated in FIG. 4.

In step S1401, the date and time change detection unit 405 determines whether the date and time of the digital MFP 110 has been changed. When the date and time change detection unit 405 detects the change of the date and time (Yes in step S1401), the processing proceeds to step S1402, in which the control unit 402 identifies the changed date and time information "2014/04/23 11:00:00". In step S1403, the communication processing unit 404 transmits, to the server PC 120, the changed date and time information as a date and time change request. The date and time change request is a notification indicating that the time obtained by the time measuring unit 211 of the image forming apparatus has been modified. Thus, the server apparatus receives, from the MFP 110a, the notification indicating that the time obtained by the time measuring unit 211 of the MFP 110a has been modified, and the modified time information (for example, the changed date and time information "2014/04/23 11:00:00") obtained by the time measuring unit 211 of the MFP 110a.

Figure 15:
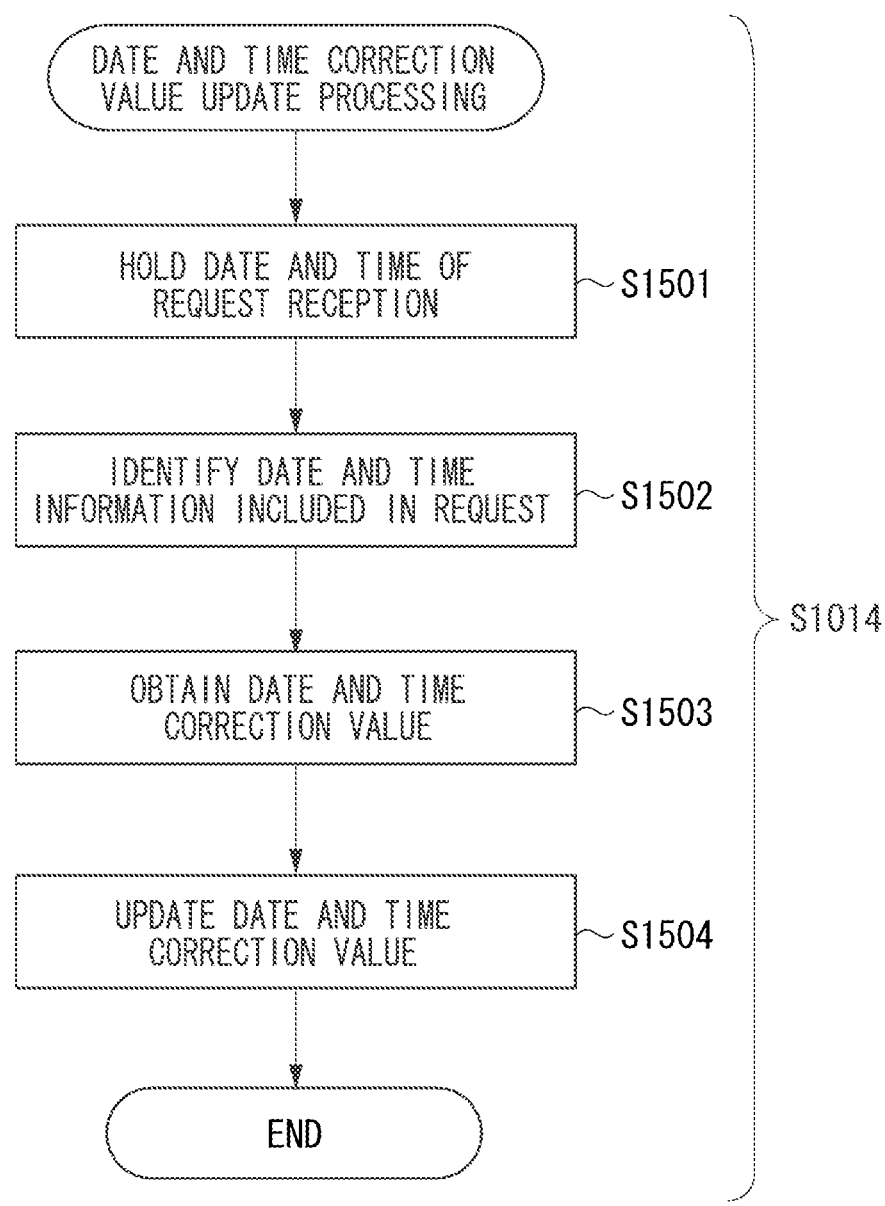
FIG. 15 is a flowchart illustrating a method for controlling the server apparatus.

Processing executed when the data management server application 500 of the server PC 120 receives the date and time change request from the MFP 110a will be described with reference to flowcharts in FIGS. 10 and 15. FIG. 15 is a flowchart illustrating a method for controlling the server apparatus according to the present exemplary embodiment. Each step is implemented by the CPU 301 of the server PC 120 executing the stored data management server application 500. The data management server application 500 is hereinafter simply referred to as the application 500. In the processing described below, the steps are executed by the modules of the application 500 executed by the CPU 301.

When the transmission and reception unit 501 receives the request from the MFP 110a, in step S1001, the MFP 110a is identified as the requestor. Then, based on the result of the analysis unit 503, the processing proceeds to step S1012 through steps S1002 and S1011. In step S1012, the control unit 502 determines that the date and time correction request has been issued, whereby the processing proceeds to the date and time correction value update processing corresponding to step S1014. In the date and time correction value update processing, in step S1501, the control unit 502 identifies the date and time information (for example, "2014/04/23 11:00:10") of the server PC 120 indicating the time when the request has been received.

In step S1502, the control unit 502 identifies "2014/04/23 11:00:00" as the date and time information included in the request, from the analysis result of the analysis unit 503. In step S1503, the control unit 502 obtains the date and time correction value "00:00:10" from the date and time information identified in step S1501 and the date and time information identified in step S1502, and transmits the information identified in step S1001 and a date and time correction request to the data processing unit 504. In step S1504, the data processing unit 504 requests the data management unit 510 to update the date and time correction value of the MFP 110a with "00:00:10", and thus the data management unit 510 updates the date and time correction value. FIG. 16 illustrates the updated information managed by the data management unit 510 after the processing is executed. As described above, the data management unit 510 that has received the date and time change request corrects the correction information (date and time correction value), based on the corrected time information (for example, "2014/04/23 11:00:00") obtained by the time measuring unit 211 of the image forming apparatus, and the time information (for example, "2014/04/23 11:00:10") obtained by the time measuring unit 311 of the server apparatus in response to the reception of the notification.

As described above, even when the MFPs 110a and 110b with different date and time settings request for the update processing on the same address data, the server PC 120 correctly updates the address data. Thus, the digital MFP 110a acquires the updated address data, whereby synchronization with the updated address data can be achieved.

Furthermore, even when the date and time of the digital MFP 110a or 110b is changed based on an input through the operation unit 220 in the course of the processing, the processing can be conducted with the correct correction value by updating the date and time correction value in the server PC 120 when the change is made.

According to the present exemplary embodiment, data can be managed in a state where information to be acquired together with date and time information from each information processing apparatus is synchronized with a reference time on the server apparatus side, based on the difference information relative to the reference time.

In a second exemplary embodiment, synchronization processing executed by the server apparatus in a case where the MFP 110a fails to be connected to the network will be described. The case where the MFP 110a fails to be connected to the network is assumed to be a case where a failure of a certain kind occurs in a local area network (LAN) connected to the MFP 110a, and then the connection to the network 100 recovers.

The values of the management data in the digital MFP 110 and the server PC 120 are assumed to be the same as those in the initial states in the first exemplary embodiment illustrated in FIGS. 7 and 9. Processing in the following case will be described. Specifically, assume that the update request to the server PC 120 has failed during the execution of a certain step described in the first exemplary embodiment, because the MFP 110a is not connected to the network 100. After a predetermined time elapses from the time when the update request has failed, the connection to the network 100 is established, and the processing in the step is resumed. In such a case, the following processing is performed. As illustrated in FIG. 7, the MFP 110a has succeeded in joining the system, but has not succeeded in connection to the network 100 after joining the system. To determine the lapse of the predetermined time, the MFP 110a is configured to calculate an elapsed time from a difference between the date and time at which the communication connection has failed and a date and time at which the communication connection has been recovered that are measured by a time measuring unit (timer) (not illustrated).

First of all, the description will be give of a case where the MFP 110a updates the address of the A corporation to "03-2345-6789" at "2014/04/23 11:00:00" as the date and time of the MFP 110a. The data synchronization application 400 holds the data update content in the job management unit 403 in step S903 as described above with reference to the flowchart in FIG. 8. When the processing of transmitting the date and time and the change content to the server PC 120 in step S904 ends in an error, the control unit 402 acquires the information from the job management unit 403 after the predetermined time elapses, and then executes the processing in step S904 again. The control unit 402 executes the processing at a predetermined interval until the processing in step S904 is successfully executed.

The data update request from the MFP 110b is processed as described in the first exemplary embodiment. FIG. 17 illustrates the resultant address data managed by the MFP 110a, the MFP 110b, and the server PC 120.

Processing executed by the data management server application 500 when the connection of the MFP 110a to the network recovers at "2014/04/23 11:30:00" and thus the processing in step S904 is successfully executed will be described with reference to the flowchart in FIG. 10. In step S1001, the control unit 502 identifies the MFP 110a as the requestor as in the first exemplary embodiment described above. In step S1002, the control unit 502 determines that the data update request has been issued (YES in step S1002), and in step S1003, the control unit 502 acquires the date and time correction value "−00:05:00" of the MFP 110a from the data management unit 510. In step S1004, the control unit 502 acquires the date and time information "2014/04/23 11:00:00" of the content received from the analysis unit 503.

In step S1005, the control unit 502 corrects the date and time information acquired in step S1004 with the date and time correction value acquired in step S1003, to obtain the date and time information "2014/04/23 10:55:00" of the update data.

In step S1006, the control unit 502 acquires the data content to be updated, from the analysis unit 503, and transmits the data content and the corrected date and time information "2014/04/23 10:55:00" obtained in step S1005, to the data processing unit 504. The data processing unit 504 acquires the latest update date and time "2014/4/23 10:59:00" of the address data to be updated, from the data management unit 510. In step S1007, the data processing unit 504 compares the latest update date and time of the address data acquired in step S1006 with the corrected date and time information obtained in step S1005 to determine whether the date and time of the update request is later than that of the held address data. Here, the update request is determined to be not new, and the processing proceeds to step S1009.

In step S1009, the data processing unit 504 rejects the request content from the control unit 502. In step S1010, the transmission and reception unit 501 returns a response indicating the update completion to the requestor, whereby the processing is completed.

As described above, the address data managed in the data management unit 510 is not updated, and thus remains in the state illustrated in FIG. 17. All things considered, the processing can be correctly executed even if the MFP 110a issues the data update request later.

Next, processing executed when the clock of the MFP 110a is set back by five minutes will be described. When the date and time change detection unit 405 detects in step S1401 that the date and time of the MFP 110a has been changed, in step S1402, the control unit 402 identifies the changed date and time information "2014/04/23 11:00:00". When the processing of transmitting the changed date and time information to the server PC 120 from the communication processing unit 404 in step S1403 ends in an error, it is determined in step S1404 that the error has occurred (Yes in step S1404), and the date and time information retransmission processing (step S1405) is executed.

Figure 18:
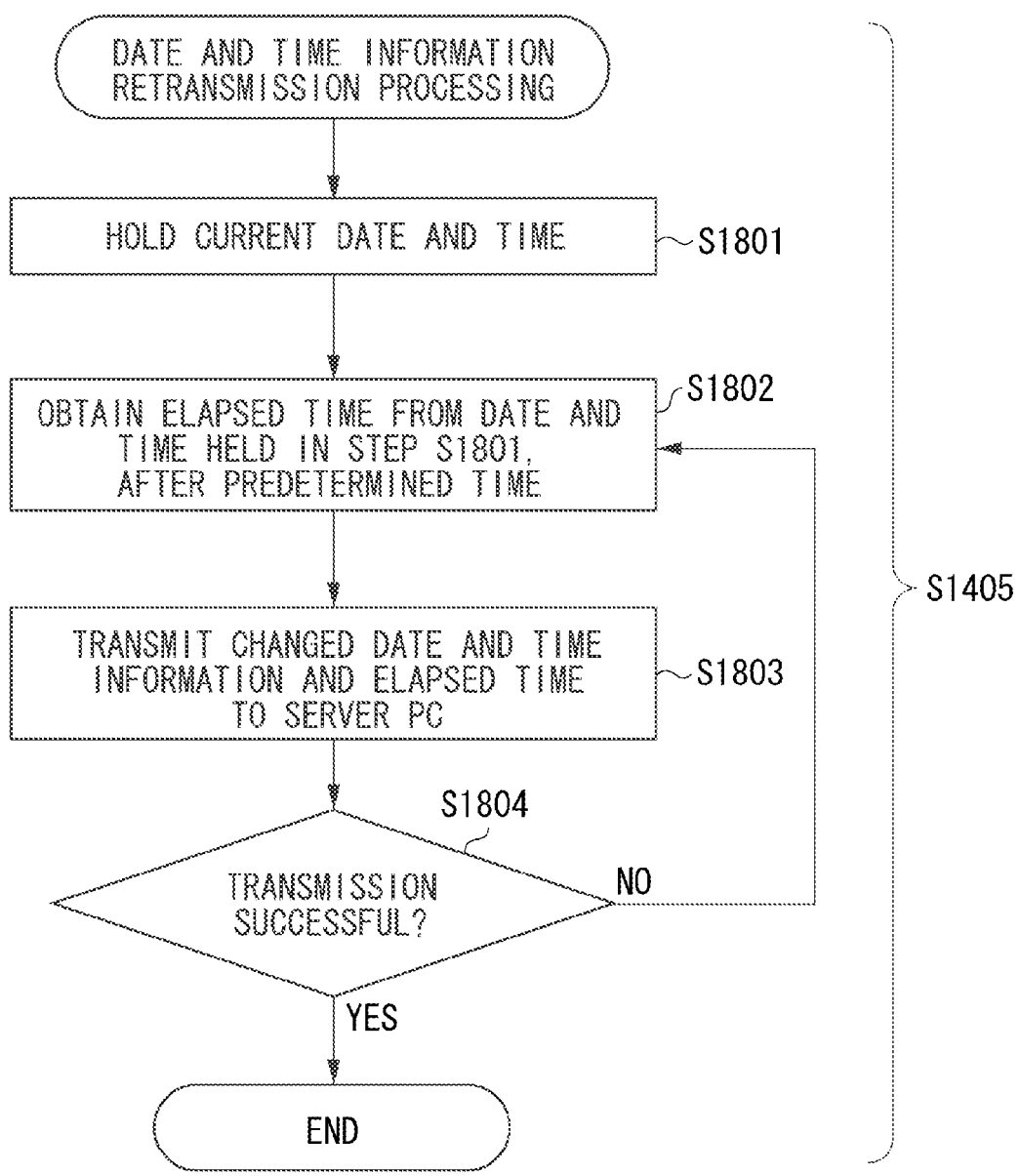
FIG. 18 is a flowchart illustrating a method for controlling the image forming apparatus.

FIG. 18 is a flowchart illustrating a method for controlling the image forming apparatus according to the present exemplary embodiment. This example corresponds to date and time information retransmission processing in the image forming apparatus. Each step is implemented by the CPU 202 executing the control program stored in the HDD 205 or the like. In the processing described below, the modules illustrated in FIG. 4 execute the steps.

In step S1801, the control unit 402 identifies the current date and time "2014/04/23 11:00:00" of the MFP110a, and holds the current date and time in the RAM 203 or the HDD 205. In step S1802, the control unit 402 measures an elapsed time (for example "00:01:00") from the date and time held in step S1801, after a predetermined time elapses. In step S1803, the communication processing unit 404 adds the elapsed time information obtained in step S1802 to the changed date and time information and transmits the obtained information as a date and time change request to the server PC 120. When the control unit 402 determines in step S1804 that the transmission has failed (No in step S1804), the processing returns to step S1802 and the elapsed time (for example "00:02:00") is obtained again after the predetermined time elapses. When the transmission is successful (Yes in step S1804), the date and time information retransmission processing is completed.

If the MFP 110a has not received a predetermined response (response indicating that the notification has been successfully transmitted) to the notification (date and time change request) from the server PC 120, the MFP 110a updates information that is included in the notification and indicates a length of time elapsed after the notification has been transmitted, and retransmits the resultant notification.

As described above, the MFP 110a transmits, to the server PC 120, period information (for example, "00:02:00") indicating a length of a period during which the notification (date and time change request) has been unable to be transmitted from the MFP 110a to the server PC 120. The server PC 120 receives, from the MFP 110a, the period information indicating a length of the period during which the notification has been unable to be transmitted, after the connection to the MFP 110a is established.

Next, the description will be given of processing executed by the data management server application 500 when the server PC 120 receives the date and time change request through the date and time information retransmission processing. Here, the description will be given of a case in which the retransmission processing is successfully executed by the MFP 110a after one minute. In step S1501 in the flowchart in FIG. 15, processing similar to that in the first exemplary embodiment is executed. At this time, the date and time held by the control unit 502 in step S1501 is one minute later than that in the first exemplary embodiment, and thus "2014/04/23 11:01:10" is held.

In step S1502, the control unit 502 identifies the date and time information "2014/04/23 11:00:00" and the elapsed time "00:01:00" that are included in the request, based on the analysis result of the analysis unit 503. The control unit 502 further identifies the date and time information "2014/04/23 11:01:00" by adding the elapsed time to the date and time information. In step S1503, the control unit 502 obtains the date and time correction value "00:00:10" from the date and time information identified in step S1501 and the date and time information identified in step S1502. Then, the control unit 502 transmits a time and date correction request together with the information identified in step S1001 to the data processing unit 504. Thus, if the server PC 120 receives the notification (date and time change request) after the connection to the MFP 110a is established, the server PC 120 modifies the correction information based on the time information (2014/04/23 11:00:00) received together with the notification, the period information (for example, the elapsed time "00:01:00"), and the time information (for example, "2014/04/23 11:01:10") obtained by the time measuring unit 311 of the server PC 120. In the example described above, the date and time correction value "00:00:10" is obtained as the modified correction information.

As described above, the date and time correction value update processing can be correctly executed even if the changed date and time information has been unable to be transmitted to the server PC 120 when the date and time is changed in the MFP 110a.

Next, the following case will be described. Specifically, the MFP 110a that has failed to be connected to the network 100 updates the address of the A corporation to "03-2345-6789" at the date and time "2014/04/23 11:00:00" of the MFP 110a. Then, after five minutes, the MFP 110a sets the clock back by five minutes, and then changes the address of the A corporation to "03-4567-8901" at the changed date and time "2014/04/23 11:15:00" of the MFP 110a. Then, the connection to the network 100 is established at the date and time "2014/04/23 11:30:00" of the MFP 110a.

The data synchronization application 400 of the MFP 110a stores the job in which the address is updated to "03-2345-6789" at "2014/04/23 11:00:00" in the job management unit 403. Then, the date and time change detection unit 405 detects that the date and time of the MFP 110a has been changed, and the control unit 402 holds the changed date and time information "2014/04/23 11:00:00" and the current date and time "2014/04/23 11:00:00" identified in step S1801. Then, in step S903, the data synchronization application 400 of the MFP 110a newly stores the job in which the address is updated to "03-4567-8901" at "2014/04/23 11:15:00" in the job management unit 403. Here, a job that has not been transmitted to the server PC 120 has already been stored in the job management unit 403. Thus, the control unit 402 does not execute the processing in step S904 on the newly stored job, and instead executes the processing in step S904 on the update job that has been stored earlier.

When the connection to the network 100 is recovered, the MFP 110a transmits the job in which the address is updated to "03-2345-6789" at "2014/04/23 11:00:00" that has been stored earlier, to the server PC 120. When the transmission is completed, the control unit 402 executes date and time information retransmission processing before executing the transmission processing for the job in which the address is updated to "03-4567-8901" at "2014/04/23 11:15:00" that has been stored in the job management unit 403 later.

Here, in step S1803, the control unit 402 transmits the changed date and time information "2014/04/23 11:00:00" and the elapsed time "00:30:00" to the server PC 120. When the date and time information retransmission processing is successfully executed, the control unit 402 executes the transmission processing for the job in which the address is updated to "03-4567-8901" at "2014/04/23 11:15:00" that has been stored in the job management unit 403.

Processing executed by the data management server application 500 of the server PC 120 that has received these requests will be described. When the first address data update request is received, this update request is rejected as described above and the processing is terminated. Then, the date and time correction value update processing is executed, and the control unit 502 holds the date and time "2014/04/23 11:30:10" in step S1501.

In step S1502, the control unit 502 identifies the date and time information "2014/04/23 11:00:00" and the elapsed time "00:30:00" that are included in the request, based on the analysis result of the analysis unit 503, and identifies the date and time information "2014/04/23 11:30:00". The date and time correction value obtained by the control unit 502 in step S1503 is "00:00:10". Finally, when the transmission and reception unit 501 receives the address data update request corresponding to "2014/04/23 11:15:00" and "03-4567-8901", in step S1003, the control unit 502 acquires the date and time correction value "00:00:10". In step S1005, the control unit 502 corrects the date and time of the address data in the address data update request to "2014/04/23 11:15:10". Thus, because the address data corresponds to the date and time later than the latest update date and time "2014/04/23 10:59:00", the data processing unit 504 updates the address data managed in the data management unit 510 to "03-4567-8901".

As described above, when the date and time is changed in the state where the communication with the server PC 120 is disabled, the update job requested before the date and time is changed is antecedently executed. Then, after the date and time correction value update processing is executed, the processing for the subsequent update job requested after the date and time is changed is executed. More specifically, the time information associated with the setting information that has been updated in the MFP 110a before the notification is issued is corrected with the correction information (date and time correction value) before the modification, and then the correction information is modified. The time information associated with the setting information that has been updated in the MFP 110a after the notification is issued is corrected with the modified correction information, and then the correction information is modified. All things considered, the address data can be correctly updated.

In a third exemplary embodiment, the description will be given of processing in which the MFP 110a updates a plurality of data pieces associated with each other as a plurality of settings described below. In the described case, the plurality of data pieces associated with each other is a plurality of settings as described below, and the settings need to be consistent between the MFPs 110a and 110b when any one of the settings is set from ON to OFF, or from ON to OFF.

FIG. 19 illustrates data stored in the data management applications 410 of the MFPs 110a and 110b as well as in the data management unit 510 of the server PC 120. Here, a key "perform authentication" and a key "use personalized setting" are associated with each other. More specifically, when the "perform authentication" is OFF, "use personalized setting" needs to be OFF. The date and time correction value held in the server PC 120 is assumed to be in the state illustrated in FIG. 7.

In other words, setting item (first setting item) indicating whether to perform authentication and a setting item (second setting item) indicating whether to use personalized setting are associated with each other in advance. Thus, information indicating whether to set an authentication function to ON or OFF is included as setting information (first setting information) related to the first setting item, and information indicating whether to set a function of using a personalized setting to ON or OFF is included as setting information (second setting information) related to the second setting item.

The description will be given below of an example of updating time information indicating a time at which the second setting information is updated, in accordance with the update of the time information indicating a time at which the first setting information is updated.

In the MFP 110a that has failed to be connected to the network 100 as described in the second exemplary embodiment, the "perform authentication" is updated to be OFF and thus, the data management application 410 accordingly updates the "use personalized setting" to be OFF. The data management application 410 requests the reception unit 401 of the data synchronization application 400 to turn OFF "perform authentication" and "use personalized setting". The data synchronization application 400 holds the date and time "2014/04/23 11:05:00" at which the request is received and the change content, as a job in the job management unit 403.

Then, "use personalized setting" is updated to be OFF in the MFP 110b. This update is performed at the date and time "2014/04/23 11:10:00" of the MFP 110b, and the data managed in the server PC 120 is updated. Then, "use personalized setting" is updated to be ON again at "2014/04/23 11:15:00" in the MFP 110b. The MFP 110b then issues the data acquisition request to the server PC 120 and acquires the latest data. Through the processing up to this point, each data (key and value) corresponding to combination management information managed in the digital MFP 110 and the server PC 120 is updated as illustrated in FIG. 20.

Next, the description will be given of a case in which the MFP 110a connects to the network 100 and executes processing that has been held in the job management unit 403. More specifically, the MFP 110a transmits a message indicating that "perform authentication" is turned "OFF" and "use personalized setting" is turned "OFF" at "2014/04/23 11:05:00" to the server PC 120. The data management server application 500 of the server PC 120 identifies the requestor and acquires a date and time correction value "−00:05:00" of the MFP 110a.

In step S1004, the control unit 502 acquires the date and time information "2014/04/23 11:05:00" of the received content. In step S1005, the control unit 502 corrects the date and time information with the date and time correction value to obtain the date and time information "2014/04/23 11:00:00". In step S1006, the control unit 502 acquires the data content to be updated, from the analysis unit 503, and transmits the data content and the corrected date and time information "2014/04/23 11:00:00" obtained in step S1005 to the data processing unit 504. The data processing unit 504 acquires the latest update date and time "2014/4/23 10:00:00" of "perform authentication" and the latest update date and time "2014/4/23 11:20:00" of "use personalized setting" that are to be updated, from the data management unit 510.

Whether the date and time of the update request is later than that of each data corresponding to the held combination management information is determined through comparison with the latest update date and time. Here, "perform authentication" is determined to be new and "use personalized setting" is determined to be old. The data processing unit 504, however, determines that "use personalized setting" needs to be turned "OFF" when "perform authentication" is updated to be "OFF", based on the attribute of the data. Thus, the data processing unit 504 requests the data management unit 510 to also update "use personalized setting" to be "OFF".

The data management unit 510 updates the requested data, and updates the data update date and time to the date and time (for example, "2014/4/23 11:30:00") at which the processing is executed. Then, the transmission and reception unit 501 returns the response indicating the update completion to the requestor, and the processing is completed. Thereafter, the MFPs 110a and 110b execute the data acquisition request processing. FIG. 21 illustrates each data corresponding to the combination management information managed in the digital MFP 110 and the server PC 120 as a result of the processing.

As described above, when each data corresponding to the combination management information is updated, data update determination is made not only by checking the update date and time for each data, but also considering inter-data association. As a result, each data corresponding to the combination management information can be correctly updated.

According to the present exemplary embodiment, data can be managed in a state where information acquired from each information processing apparatus together with date and time information is synchronized with a reference time on a server apparatus side, based on difference information relative to the reference time.

The present invention is not limited to the exemplary embodiments described above, and can be modified in various ways (including possible combinations between the exemplary embodiments) based on the spirit of the present invention, and such modifications are not excluded from the scope of the present invention.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

According to an exemplary embodiment of the present invention, data can be managed in a state where information acquired from each information processing apparatus together with date and time information is synchronized with a reference time on a server apparatus side, based on difference information relative to the reference time.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-152984, filed Jul. 28, 2014, which is hereby incorporated by reference herein in its entirety.

What is claimed is:

1. An information processing apparatus, comprising:
a reception unit configured to receive, from an image forming apparatus, first time information obtained by the image forming apparatus, second time information obtained by the image forming apparatus in accordance with update of setting information of the image forming apparatus, and update information indicating the updated setting information;
a storage unit configured to store setting information of the image forming apparatus in association with time information indicating a time at which the setting information is updated;
a time measuring unit configured to measure a time;
a holding unit configured to hold correction information generated through comparison between the first time information and third time information obtained by the time measuring unit in response to reception of the first time information;
an acquisition unit configured to acquire corrected time information obtained by correcting the second time information received by the reception unit with the correction information; and
a determination unit configured to determine whether to update the setting information stored in the storage unit using the update information received by the reception unit, based on comparison between the time information associated with the setting information stored in the storage unit and the corrected time information.

2. The information processing apparatus according to claim 1, wherein the determination unit determines to update the setting information stored in the storage unit using the update information received by the reception unit, in a case where a time indicated by the corrected time information is later than a time indicated by the time information associated with the setting information stored in the storage unit.

3. The information processing apparatus according to claim 1, wherein the determination unit determines not to update the setting information stored in the storage unit using the update information received by the reception unit, in a case where a time indicated by the corrected time information is earlier than a time indicated by the time information associated with the setting information stored in the storage unit.

4. The information processing apparatus according to claim 1, further comprising an update unit configured to update time information stored in the storage unit,
wherein the storage unit stores time information indicating a time at which setting information of the image forming apparatus is updated, and
wherein the update unit updates the time information stored in the storage unit with the corrected time information, in a case where the setting information stored in the storage unit is updated using the update information received by the reception unit.

5. The information processing apparatus according to claim 1, wherein the correction information is information indicating a difference between the first time information and the third time information obtained by the time measuring unit in response to the reception of the first time information.

6. The information processing apparatus according to claim 1, further comprising a modification unit configured to modify the correction information held in the holding unit,
wherein the reception unit receives, from the image forming apparatus, a notification indicating that a time measured by a time measuring unit of the image forming apparatus has been modified, and modified time information obtained by the time measuring unit of the image forming apparatus, and
wherein, in a case where the reception unit has received the notification, the modification unit modifies the correction information held in the holding unit, based on the modified time information obtained by the time measuring unit of the image forming apparatus and time information obtained by the time measuring unit of the information processing apparatus in response to the reception of the notification.

7. The information processing apparatus according to claim 1, further comprising a modification unit configured to modify the correction information held in the holding unit,
wherein the reception unit receives, from the image forming apparatus, a notification indicating that a time obtained by a time measuring unit of the image forming apparatus has been modified, and modified time information obtained by the time measuring unit of the image forming apparatus, and further receives, from the image forming apparatus, period information indicating a length of a period during which the notification has not been able to be transmitted from the image forming apparatus to the information processing apparatus, after communication to the image forming apparatus is established, and
wherein, in a case where the reception unit receives the notification, the modification unit modifies the correction information held in the holding unit, based on the modified time information received together with the notification, the period information, and time information obtained by the time measuring unit of the information processing apparatus.

8. The information processing apparatus according to claim 1, further comprising a modification unit configured to modify the correction information held in the holding unit,
wherein the reception unit receives, from the image forming apparatus, a notification indicating that a time obtained by a time measuring unit of the image forming apparatus has been modified, and
wherein the modification unit modifies the correction information held in the holding unit, after time information associated with setting information updated in the image forming apparatus before the notification has been issued is corrected with the correction information before the modification.

9. The information processing apparatus according to claim 1, further comprising:
a modification unit configured to modify the correction information held in the holding unit; and
a correction unit configured to correct time information received by the reception unit with the correction information,
wherein the reception unit receives, from the image forming apparatus, a notification indicating that a time obtained by a time measuring unit of the image forming apparatus has been modified, and
wherein the correction unit corrects time information associated with setting information updated in the image forming apparatus after the notification has been issued, with the correction information modified by the modification unit.

10. The information processing apparatus according to claim 1, further comprising an update unit configured to update time information stored in the storage unit, in a case where the setting information stored in the storage unit is updated with the setting information received by the reception unit,
wherein the storage unit stores time information indicating a time at which first setting information of a first setting item is updated and time information indicating a time at which second setting information of a second setting item is updated, the first and the second setting items being associated with each other in advance, and
wherein the update unit updates the time information that is stored in the storage unit and indicates the time at which the second setting information is updated, in accordance with update of the time information indicating the time at which the first setting information is updated.

11. An image forming apparatus, comprising:
a time measuring unit;
a storage unit configured to store setting information to be used for operating the image forming apparatus; and
a transmission unit configured to transmit, in response to the image forming apparatus switching from a state of not being communicating with an information processing apparatus to a state of being communicating with the information processing apparatus, first time information obtained by the time measuring unit, and after transmitting the first time information, transmit second time information obtained by the time measuring unit at a timing at which the setting information stored in the storage unit is updated and update information indicating the updated setting information to the information processing apparatus,
wherein
the transmitted first time information is used by the information processing apparatus to generate correction information indicating a gap between a time measured by the time measuring unit of the image forming apparatus and a time measured by a time measuring unit of the information processing apparatus, and
the transmitted second time information and the correction information are used by the information processing apparatus to determine whether to update setting information managed by the information processing apparatus using the update information transmitted by the transmission unit.

12. The image forming apparatus according to claim 11, wherein the transmission unit transmits, to the information processing apparatus, a notification indicating that the time measuring unit is coordinated so that a time measured by the time measuring unit is modified, and modified time information obtained by the time measuring unit
wherein the correction information is modified by the information processing apparatus in a case where the notification is received by the information processing apparatus.

13. The image forming apparatus according to claim 11, wherein the transmission unit transmits, to the information processing apparatus, a notification indicating that a time measured by the time measuring unit has been modified, and in a case where a predetermined response to the notification is not received from the information processing apparatus, updates information that is included in the notification and indicates a length of time elapsed after the notification has been transmitted, and retransmits the notification.

14. The image forming apparatus according to claim 13, further comprising:
a timer unit configured to measure an elapsed time from a time at which the notification is transmitted; and
a holding unit configured to hold the elapsed time measured by the timer unit.

15. An information processing system in which an image forming apparatus and an information processing apparatus are connected to each other,
wherein the image forming apparatus comprises:
a first time measuring unit;
a first storage unit configured to store setting information to be used for operating the image forming apparatus; and a first transmission unit configured to transmit, in response to the image forming apparatus switching from a state of not being communicating with the information processing apparatus to a state of being communicating with the information processing apparatus, first time information obtained by the first time measuring unit, and after transmitting the first time information, transmit second time information obtained by the first time measuring unit at a timing at which the setting information stored in the first storage unit is updated, and update information indicating the updated setting information to the information processing apparatus, wherein the information processing apparatus comprises:

a reception unit configured to receive, from the image forming apparatus, the first time information, the second time information obtained by the first time measuring unit at a timing at which the setting information is updated, and the update information indicating the setting information updated at a time indicated by the second time information;

a second storage unit configured to store setting information of the image forming apparatus in association with time information indicating a time at which the setting information is updated;

a second time measuring unit configured to measure a time;

a holding unit configured to hold correction information generated through comparison between the first time information and third time information obtained by the second time measuring unit in response to reception of the first time information;

an acquisition unit configured to acquire corrected time information obtained by correcting the second time information received by the reception unit with the correction information; and a determination unit configured to determine whether to update the setting information stored in the second storage unit using the update information received by the reception unit, based on comparison between time information associated with the setting information stored in the second storage unit and the corrected time information.

16. A method for controlling an information processing apparatus, the method comprising:

receiving, as first receiving, from an image forming apparatus, first time information obtained by the image forming apparatus;

measuring a time;

holding, in a holding unit, correction information generated through comparison between the first time information and third time information obtained in the measuring in response to reception of the first time information;

storing, in a storage unit, setting information of the image forming apparatus in association with time information indicating a time at which the setting information is updated;

receiving, as second receiving, from the image forming apparatus, second time information obtained by the image forming apparatus in accordance with update of setting information of the image forming apparatus, and update information indicating the updated setting information;

acquiring corrected time information obtained by correcting the second time information received in the second receiving with the correction information; and determining whether to update the setting information stored in the storage unit using the update information received in the second receiving, based on comparison between time information associated with the setting information stored in the storage unit and the corrected time information.

17. The method according to claim 16, wherein the determining determines to update the setting information stored in the storage unit using the update information received in the second receiving, in a case where a time indicated by the corrected time information is later than a time indicated by the time information associated with the setting information stored in the storage unit.

18. A method for controlling an image forming apparatus, the method comprising:

measuring a time by a time measuring unit;

storing, in a storage unit, setting information to be used for operating the image forming apparatus; and transmitting, in response to the image forming apparatus switching from a state of not being communicating with an information processing apparatus to a state of being communicating with the information processing apparatus, first time information obtained in the measuring, and after transmitting the first time information, transmitting second time information obtained in the measuring at a timing at which the setting information stored in the storage unit is updated, and update information indicating the updated setting information to the information processing apparatus, wherein the transmitted first time information is used by the information processing apparatus to generate correction information indicating a gap between a time measured by the time measuring unit of the image forming apparatus and a time measured by a time measuring unit of the information processing apparatus, and the transmitted second time information and the correction information are used by the information processing apparatus to determine whether to update setting information managed by the information processing apparatus using the update information transmitted in the transmitting.

19. The method according to claim 18, wherein the transmitting transmits, to the information processing apparatus, a notification indicating that the time measuring unit of the image forming apparatus is coordinated so that a time obtained in the measuring is modified, and modified time information obtained in the measuring, wherein the correction information is modified by the information processing apparatus in a case where the notification is received by the information processing apparatus.

20. A non-transitory computer readable storage medium storing a program for causing a computer to execute a method, the method comprising:

receiving, as first receiving, from an image forming apparatus, first time information obtained by the image forming apparatus;

measuring a time;

holding, in a holding unit, correction information generated through comparison between the first time information and third time information obtained in the measuring in response to reception of the first time information;

storing, in a storage unit, setting information of the image forming apparatus in association with time information indicating a time at which the setting information is updated;

receiving, as second receiving, from the image forming apparatus, second time information obtained by the image forming apparatus in accordance with update of setting information of the image forming apparatus, and update information indicating the updated setting information;

acquiring corrected time information obtained by correcting the second time information received in the second receiving with the correction information; and determining whether to update the setting information stored in the storage unit using the update information received in the second receiving, based on comparison between time information associated with the setting information stored in the storage unit and the corrected time information.

21. A non-transitory computer readable storage medium storing a program for causing a computer to execute a method, the method comprising:

measuring a time;

storing, in a storage unit, setting information to be used for operating an image forming apparatus; and transmitting, in response to the image forming apparatus switching from a state of not being communicating with an information processing apparatus to a state of being communicating with the information processing apparatus, first time information obtained in the measuring, and after transmitting the first time information, transmitting second time information obtained in the measuring at a timing at which the setting information stored in the storage unit is updated, and update information indicating the updated setting information to the information processing apparatus, wherein the transmitted first time information is used by the information processing apparatus to generate correction information indicating a gap between a time measured by a time measuring unit of the image forming apparatus and a time measured by a time measuring unit of the information processing apparatus, and the transmitted second time information and the correction information are used by the information processing apparatus to determine whether to update setting information managed by the information processing apparatus using the update information transmitted at the transmitting.

22. An information processing apparatus, comprising:

a network interface that receives, from an image forming apparatus, first time information obtained by the image forming apparatus, second time information obtained by the image forming apparatus in accordance with update of setting information of the image forming apparatus, and update information indicating the updated setting information;

a first storage that stores setting information of the image forming apparatus in association with time information indicating a time at which the setting information is updated;

a time measuring unit that measures a time;

a second storage that holds correction information generated through comparison between the first time information and third time information obtained by the time measuring unit in response to reception of the first time information; and at least one processor and at least one memory coupled to the at least one processor which act as:

an acquisition unit configured to acquire corrected time information obtained by correcting the second time information received by the network interface with the correction information; and a determination unit configured to determine whether to update the setting information stored in the first storage using the update information received by the network interface, based on comparison between the time information associated with the setting information stored in the first storage and the corrected time information.

23. The information processing apparatus according to claim 22, wherein the determination unit determines to update the setting information stored in the first storage using the update information received by the network interface, in a case where a time indicated by the corrected time information is later than a time indicated by the time information associated with the setting information stored in the first storage.

* * * * *